United States Patent
Sakaguchi et al.

(10) Patent No.: US 10,337,958 B2
(45) Date of Patent: Jul. 2, 2019

(54) BEARING DEVICE VIBRATION ANALYSIS METHOD, BEARING DEVICE VIBRATION ANALYZER, AND ROLLING BEARING CONDITION MONITORING SYSTEM

(71) Applicant: NTN CORPORATION, Osaka (JP)

(72) Inventors: Tomoya Sakaguchi, Kuwana (JP); Hideyuki Tsutsui, Kuwana (JP)

(73) Assignee: NTN CORPORATION, Osaka (JP)

( * ) Notice: Subject to any disclaimer, the term of this patent is extended or adjusted under 35 U.S.C. 154(b) by 502 days.

(21) Appl. No.: 14/655,304

(22) PCT Filed: Dec. 19, 2013

(86) PCT No.: PCT/JP2013/084047
§ 371 (c)(1),
(2) Date: Sep. 8, 2015

(87) PCT Pub. No.: WO2014/103861
PCT Pub. Date: Jul. 3, 2014

(65) Prior Publication Data
US 2015/0369698 A1 Dec. 24, 2015

(30) Foreign Application Priority Data
Dec. 25, 2012 (JP) .................. 2012-281038
Aug. 1, 2013 (JP) .................. 2013-160398

(51) Int. Cl.
*F16C 19/00* (2006.01)
*G01M 13/045* (2019.01)
(Continued)

(52) U.S. Cl.
CPC .......... *G01M 13/045* (2013.01); *F16C 19/00* (2013.01); *F16C 19/527* (2013.01); *G01M 13/04* (2013.01)

(58) Field of Classification Search
None
See application file for complete search history.

(56) References Cited

U.S. PATENT DOCUMENTS 5,811,683 A * 9/1998 Yoshioka ............ G01M 13/045
324/207.25
6,553,837 B1 * 4/2003 Lysen .................... G01H 1/003
73/579

(Continued)

FOREIGN PATENT DOCUMENTS

CN 101832857 A 9/2010
CN 101839804 A 9/2010

(Continued)

OTHER PUBLICATIONS

Supplementary European Search Report EP Application No. 13 86 8771.0 dated Jul. 13, 2016.

(Continued)

*Primary Examiner* — Cory W Eskridge
(74) *Attorney, Agent, or Firm* — McDermott Will & Emery LLP

(57) ABSTRACT

A vibration analysis method includes the steps of: inputting damage data of a rolling bearing; calculating, by a dynamics analysis program, a history of an exciting force occurring to the rolling bearing due to damage when a rotational shaft of the rolling bearing is rotated; calculating, by a mode analysis program, a vibration characteristics model of the bearing device; and calculating a vibration waveform at a predetermined position on the bearing device by applying to the vibration characteristics model the history of the exciting force calculated in the step of calculating a history of an exciting force.

10 Claims, 14 Drawing Sheets

(51) Int. Cl.
*F16C 19/52* (2006.01)
*G01M 13/04* (2019.01)

(56) References Cited

U.S. PATENT DOCUMENTS

| | | |
|---|---|---|
| 2005/0246150 A1 | 11/2005 | Shiromaru et al. |
| 2007/0277613 A1 | 12/2007 | Iwatsubo et al. |
| 2008/0234964 A1 | 9/2008 | Miyasaka et al. |
| 2012/0128492 A1 | 5/2012 | Liedel et al. |
| 2015/0369698 A1 | 12/2015 | Sakaguchi et al. |

FOREIGN PATENT DOCUMENTS

| | | |
|---|---|---|
| CN | 102459948 A | 5/2012 |
| EP | 2940449 A1 | 11/2015 |
| EP | 3029449 A1 | 6/2016 |
| JP | 2004-003891 A | 1/2004 |
| JP | 2005-291738 A | 10/2005 |
| JP | 2006-234785 A | 9/2006 |
| JP | 2007-298458 A | 11/2007 |
| JP | 2008-116040 A | 5/2008 |
| JP | 2008-128742 A | 6/2008 |
| JP | 2009-150434 A | 7/2009 |
| JP | 4495119 B2 | 6/2010 |
| JP | 2012-026500 A | 2/2012 |
| WO | 2014/103861 A1 | 7/2014 |

OTHER PUBLICATIONS

Office Action dated Jun. 20, 2017, issued in Chinese Patent Application No. 201380067888.4, with English language translation.
International Search Report PCT/JP2013/084047 dated Feb. 25, 2014 with English translation.
Mariko Sekiya, "Integrated Bearing Dynamic Analysis System (IBDAS)", NTN Technical Review, Nov. 25, 2011, No. 79, pp. 119-124, with English language Abstract.
Decision to Grant issued in corresponding Japanese Patent Application No. 2013-160398, dated Jul. 25, 2017.

* cited by examiner

BEARING DEVICE VIBRATION ANALYSIS METHOD, BEARING DEVICE VIBRATION ANALYZER, AND ROLLING BEARING CONDITION MONITORING SYSTEM

CROSS-REFERENCE TO RELATED APPLICATIONS

This application is the U.S. National Phase of PCT/JP2013/084047 filed Dec. 19, 2013, which claims priority to Japanese Patent Application No. 2012-281038 filed Dec. 25, 2012, and Japanese Patent Application No. 2013-160398 filed Aug. 1, 2013. The subject matter of each is incorporated herein by reference in entirety.

TECHNICAL FIELD

The present invention relates to a bearing device vibration analysis method, a bearing device vibration analyzer, and a rolling bearing condition monitoring system, and particularly relates to a technique of analyzing, by a computer, vibration of a bearing device which includes a rolling bearing and its housing, and to a rolling bearing condition monitoring system by which the results of the analysis are used.

BACKGROUND ART

Japanese Patent Laying-Open No. 2006-234785 (PTD 1) discloses an abnormality diagnosing apparatus for a rolling bearing. With this abnormality diagnosing apparatus, a frequency analysis of an electric signal from a vibration sensor is conducted and, based on a spectrum obtained from the frequency analysis, a reference value is calculated. A peak of the spectrum that is larger than the reference value is sampled. Then, a frequency between the peaks and a frequency component owing to damage to the bearing and calculated based on the rotational speed are compared and checked with each other. Based on the results of the check, whether an abnormality of the rolling bearing is present or not and where the abnormality is present are determined (see PTD 1).

CITATION LIST

Patent Document

PTD 1: Japanese Patent Laying-Open No. 2006-234785

SUMMARY OF INVENTION

Technical Problem

The above-described abnormality diagnosing apparatus determines that the bearing has an abnormality when the magnitude of the peak of the vibration waveform exceeds a predetermined threshold. Meanwhile, in order to select this threshold value for the abnormality diagnosis, it is necessary to recognize in advance the state of vibration when the bearing has an abnormality. A technique of recognizing the state of vibration when the bearing has an abnormality may for example be a technique by which a damaged bearing is intentionally incorporated in an actual machine or an actual machine is kept operated until the bearing is damaged, to thereby collect data about vibration which is exhibited when the bearing has an abnormality.

Such a technique, however, is difficult to apply to an installation under the condition that the installation has a large size or a long lifetime, or is expensive. In particular, a wind power generation facility meets this condition, and it is difficult to select a threshold value which is used for making a determination about an abnormality of the bearing by a condition monitoring system which monitors the condition of the wind power generation facility. Therefore, for a large-sized facility such as wind power generation facility, a threshold value which is used for making a determination about an abnormality is determined by statistically processing actual data collected regardless of differences in structural details and differences in machine type, for example.

It is therefore desired that the vibration state exhibited when an abnormality occurs to the bearing can be analyzed in advance by a computer. If the vibration state of the bearing device can be predicted through analysis by a computer, the threshold value used for making a determination about an abnormality of a large-sized facility such as wind power generation facility can easily be set. Moreover, in such a case as well where a sensor for detecting vibration of the bearing device is to be relocated, the threshold value used for making a determination about an abnormality can be set without newly collecting data with an actual machine.

The present invention has been made to solve the above problem, and an object of the present invention is to provide a vibration analysis method and a vibration analyzer for analyzing, by a computer, vibration of a bearing device which includes a rolling bearing and its housing.

Another object of the present invention is to provide a rolling bearing condition monitoring system by which the results of analysis in accordance with such a vibration analysis method are used.

Solution to Problem

According to the present invention, a bearing device vibration analysis method is a bearing device vibration analysis method for analyzing, by a computer, vibration of a bearing device including a rolling bearing and a housing of the rolling bearing. The method includes the steps of: inputting data about a shape of damage given to a contact portion where a rolling element and a raceway surface of the rolling bearing contact each other; calculating a history of an exciting force by a dynamics analysis program for conducting a dynamics analysis of the rolling bearing, the history of the exciting force occurring to the rolling bearing due to the damage when a rotational shaft of the rolling bearing is rotated; calculating a vibration characteristics model by a mode analysis program for analyzing a vibration mode of the bearing device, the vibration characteristics model representing vibration characteristics of the bearing device; and calculating a vibration waveform at a predetermined position on the bearing device by applying to the vibration characteristics model the history of the exciting force calculated in the step of calculating a history of an exciting force.

Preferably, in the step of calculating a vibration waveform, the history of the exciting force is applied to at least one point on a central axis of a rotational ring of the rolling bearing in the vibration characteristics model. It should be noted that in order to take into consideration the influence of moment, it may be applied to a plurality of points on the central axis of the rotational ring (inner ring for example).

Preferably, the bearing device vibration analysis method further includes the step of determining a threshold value of a magnitude of vibration for determining that the rolling bearing is abnormal, using the vibration waveform calculated in the step of calculating a vibration waveform.

Preferably, the rolling bearing is a ball bearing. The step of calculating a history of an exciting force includes the steps of: calculating, by a contact analysis program for analyzing contact between a rolling element and a raceway surface of the rolling bearing, a variation of an approach amount between the rolling element and the raceway surface caused by the given damage; and calculating, by the dynamics analysis program, the history of the exciting force occurring to the rolling bearing due to the variation of the approach amount when the rotational shaft of the rolling bearing is rotated.

Preferably, the rolling bearing is a roller bearing. For the dynamics analysis program, a slice method is used by which a contact load is calculated for each of minute-width sections which are obtained by slicing a contact portion between a roller and a raceway surface along an axial direction of the roller. The bearing device vibration analysis method further includes the step of calculating, for each slice, a variation of an approach amount between the roller and the raceway surface caused by given damage. The step of calculating a history of an exciting force includes the step of calculating the history of the exciting force by the dynamics analysis program for which the slice method is used.

Preferably, the approach amount is an elastic approach amount.

Preferably, in the step of calculating a history of an exciting force, it is supposed that a stationary ring of the rolling bearing is connected to the housing through a linear spring in a bearing radial direction at a position of a rolling element within a load-applied area.

Preferably, in the step of calculating a vibration waveform, the history of the exciting force is applied to a rolling element within a load-applied area, depending on a share of a force supported by each rolling element within the load-applied area.

According to the present invention, a bearing device vibration analysis method is a bearing device vibration analysis method for analyzing, by a computer, vibration of a bearing device including a rolling bearing and a housing of the rolling bearing. The method includes the steps of: inputting data about a shape of damage given to a contact portion where a rolling element and a raceway surface of the rolling bearing contact each other; and calculating a vibration waveform by a dynamics analysis program, the vibration waveform occurring at a predetermined position on the bearing device due to the damage when a rotational shaft of the rolling bearing is rotated, the dynamics analysis program conducting a dynamics analysis of the rolling bearing based on a dynamics analysis model to which vibration characteristics of the rotational shaft and the housing of the rolling bearing are introduced by means of a technique which can take an elastic deformation into consideration, the technique including a mode synthesis method.

According to the present invention, a bearing device vibration analyzer is a bearing device vibration analyzer for analyzing vibration of a bearing device including a rolling bearing and a housing of the rolling bearing. The analyzer includes: an input unit for inputting data about a shape of damage given to a contact portion where a rolling element and a raceway surface of the rolling bearing contact each other; an exciting force calculation unit calculating a history of an exciting force by a dynamics analysis program for conducting a dynamics analysis of the rolling bearing, the history of the exciting force occurring to the rolling bearing due to the damage when a rotational shaft of the rolling bearing is rotated; a vibration characteristics calculation unit calculating a vibration characteristics model by a mode analysis program for analyzing a vibration mode of the bearing device, the vibration characteristics model representing vibration characteristics of the bearing device; and a vibration waveform calculation unit calculating a vibration waveform at a predetermined position on the bearing device by applying, to the vibration characteristics model calculated by the vibration characteristics calculation unit, the history of the exciting force calculated by the exciting force calculation unit.

According to the present invention, a rolling bearing condition monitoring system includes a vibration sensor and a determination unit. The vibration sensor measures vibration of a bearing device including a rolling bearing and a housing of the rolling bearing. The determination unit is configured to determine that the rolling bearing is abnormal when a magnitude of the vibration measured with the vibration sensor exceeds a predetermined threshold value. The predetermined threshold value is determined by using a vibration waveform calculated according to a vibration analysis method for analyzing vibration of the bearing device by a computer. The vibration analysis method includes the steps of: inputting data about a shape of damage given to a contact portion where a rolling element and a raceway surface of the rolling bearing contact each other; calculating a history of an exciting force by a dynamics analysis program for conducting a dynamics analysis of the rolling bearing, the history of the exciting force occurring to the rolling bearing due to the damage when a rotational shaft of the rolling bearing is rotated; calculating a vibration characteristics model by a mode analysis program for analyzing a vibration mode of the bearing device, the vibration characteristics model representing vibration characteristics of the bearing device; and calculating a vibration waveform at a position where the vibration sensor is placed on the bearing device, by applying to the vibration characteristics model the history of the exciting force calculated in the step of calculating a history of an exciting force.

Advantageous Effects of Invention

According to the present invention, data about a shape of damage to a bearing is input, and a history of an exciting force occurring to the rolling bearing due to the damage when the rotational shaft of the rolling bearing is rotated is calculated by the dynamics analysis program. Then, to a vibration characteristics model of the bearing device calculated by the mode analysis program, the history of the exciting force is applied, and the vibration waveform at a predetermined position on the bearing device (location where the vibration sensor is placed for example) is calculated. Accordingly, the vibration waveform of the bearing device which will be exhibited in the case of occurrence of damage in the bearing can be predicted by a computer. Thus, according to the present invention, the results of the prediction can be used to appropriately determine the threshold value which is used by the condition monitoring system of the rolling bearing to make a determination about an abnormality of the rolling bearing.

DESCRIPTION OF EMBODIMENTS

Figure 1:
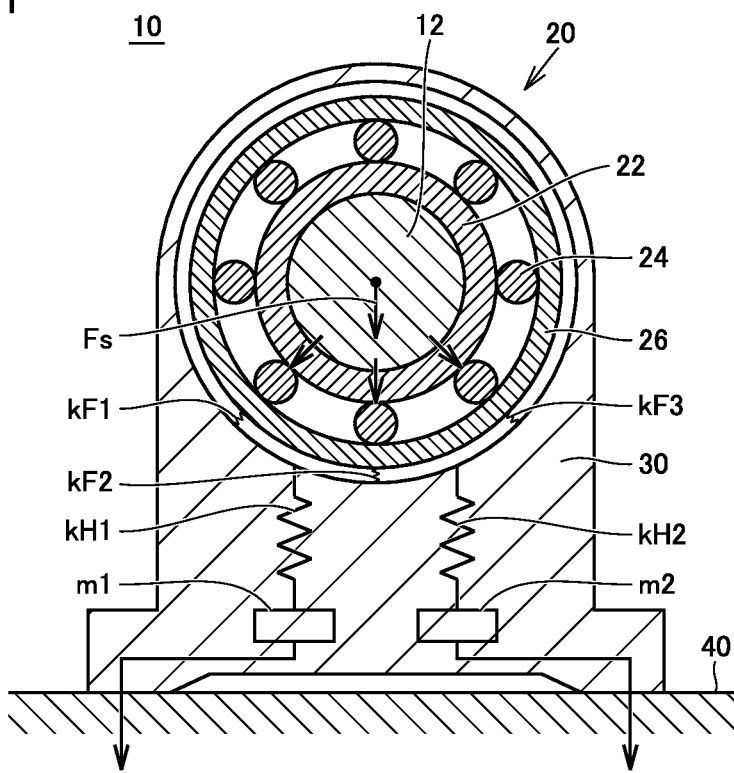
FIG. 1 is a diagram showing a model of a bearing device analyzed by a vibration analysis method according to a first embodiment of the present invention.

Embodiments of the present invention will hereinafter be described in detail with reference to the drawings. In the drawings, the same or corresponding parts are denoted by the same reference characters, and a description thereof will not be repeated.

First Embodiment

FIG. 1 is a diagram showing a model of a bearing device 10 analyzed by a vibration analysis method according to a first embodiment of the present invention. Referring to FIG. 1, bearing device 10 includes a rolling bearing 20 and a housing 30. The first embodiment will be described regarding the case where rolling bearing 20 is a ball bearing. Rolling bearing 20 includes an inner ring 22, a plurality of rolling elements 24, and an outer ring 26.

Inner ring 22 is fit on a rotational shaft 12 and rotated together with rotational shaft 12. Outer ring 26 is a stationary ring provided outward relative to inner ring 22 and fit in housing 30. A plurality of rolling elements 24 are each a spherical ball, and are located between inner ring 22 and outer ring 26 with the intervals therebetween kept by a cage (not shown). Housing 30 is fixed to a base 40 with bolts (not shown).

Regarding this model, it is supposed that outer ring 26 which is a stationary ring is connected to housing 30 through linear springs kF1 to kF3 in the bearing radial direction at the positions of rolling elements, which are located within a load-applied area, among a plurality of rolling elements 24. Further, as to a coupling portion where housing 30 and base 40 are coupled to each other, masses m1, m2 are exerted respectively on linear springs kH1, kH2, like coupling with bolts.

Description of Vibration Analysis Method for Bearing Device 10

Figure 2:
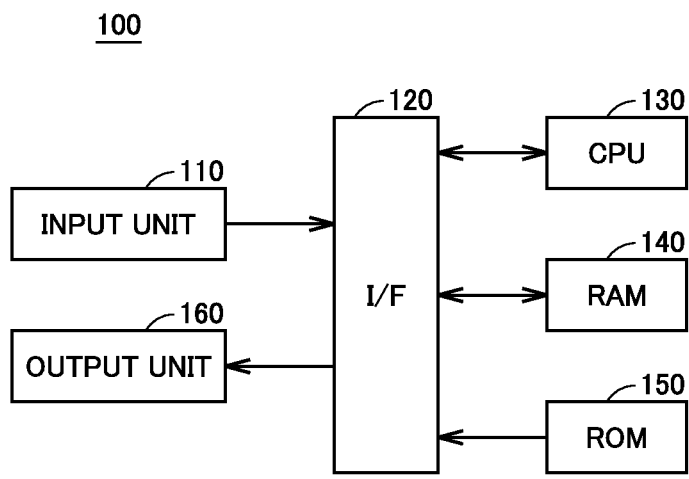
FIG. 2 is a block diagram showing main components in a hardware configuration of a vibration analyzer according to the first embodiment.

FIG. 2 is a block diagram showing main components in a hardware configuration of a vibration analyzer according to the first embodiment. Referring to FIG. 2, a vibration analyzer 100 includes an input unit 110, an interface (I/F) unit 120, a CPU (Central Processing Unit) 130, a RAM (Random Access Memory) 140, a ROM (Read Only Memory) 150, and an output unit 160.

CPU 130 executes a variety of programs stored in ROM 150 to thereby implement a vibration analysis method detailed later herein. RAM 140 is used as a work area by CPU 130. In ROM 150, a program including steps of a flowchart (described later herein) showing a procedure of the vibration analysis method is recorded. Input unit 110 is a means for reading external data, such as keyboard and/or mouse, recording medium, communication device, or the like. Output unit 160 is a means for outputting the results of operations by CPU 130, such as display, recording medium, communication device, or the like.

Figure 3:
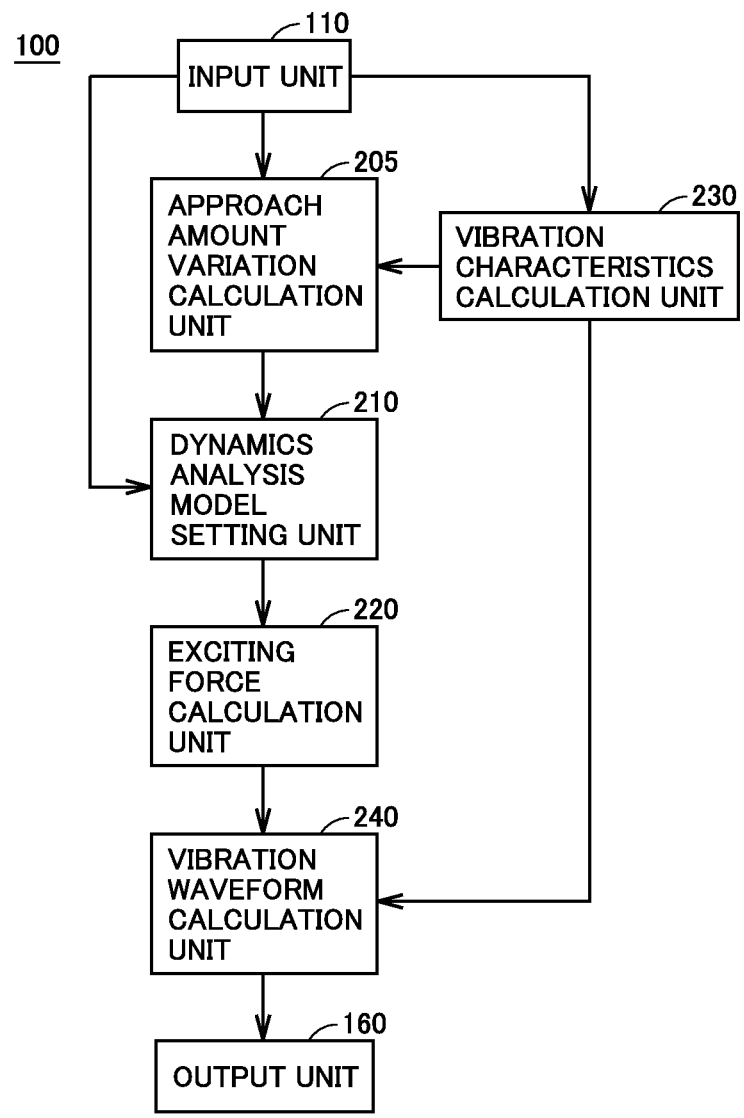
FIG. 3 is a functional block diagram functionally showing a configuration of the vibration analyzer shown in FIG. 2.

FIG. 3 is a functional block diagram functionally showing a configuration of vibration analyzer 100 shown in FIG. 2. Referring to FIG. 3 together with FIG. 1, vibration analyzer 100 includes an approach amount variation calculation unit 205, a dynamics analysis model setting unit 210, an exciting force calculation unit 220, a vibration characteristics calculation unit 230, a vibration waveform calculation unit 240, as well as the above-described input unit 110 and output unit 160.

A prediction of vibration of bearing device 10 by this vibration analyzer 100 generally includes two predictions. Namely, one is a prediction of a history of an exciting force which occurs to rolling bearing 20 when the rotational shaft of rolling bearing 20 is rotated, due to damage to a contact portion where rolling element 24 and a raceway surface (the outer circumferential surface of inner ring 22 or the inner circumferential surface of outer ring 26) of rolling bearing 20 are in contact with each other. The other is a prediction of a waveform of vibration occurring at a location where a vibration sensor (not shown) is placed on bearing device 10, due to transmission, through housing 30, of the aforementioned exciting force occurring to rolling bearing 20.

From input unit 110, characteristics data about rolling bearing 20, data about the shape of damage given to the contact portion where rolling element 24 and the raceway surface are in contact with each other (hereinafter also referred to as "damage data"), lubrication conditions, operating conditions (such as rotational speed), and characteristics data about rotational shaft 12 and housing 30 which are coupled to rolling bearing 20, for example, are input. Input unit 110 may be a data input means for which a Web interface is used, a reading means for reading data from a recording medium on which the aforementioned data are recorded in a predetermined format, a communication device receiving the aforementioned data externally transmitted in a predetermined format, or the like.

Approach amount variation calculation unit 205 receives from input unit 110 the data regarding rolling elements 24 and their raceway as well as the damage data. Then, approach amount variation calculation unit 205 calculates a variation of an approach amount between rolling element 24 and the raceway surface that is caused by the given damage, by a contact analysis program for analyzing the contact between rolling element 24 and the raceway surface. The contact analysis program calculates a contact pressure distribution of the contact portion by means of the finite element method (FEM) for example, and calculates the approach amount between rolling element 24 and the raceway surface that depends on whether the damage is present or not.

For the contact analysis, preferably elasto-plastic analysis, which even takes into consideration plastic deformation of the contact portion, is used. This is for the reason that if the contact portion between rolling element 24 and the raceway surface has damage, the surface pressure may become high to the extent that causes local plastic deformation. In order to simplify the calculation, approach amount variation calculation unit 205 may use elastic analysis for the contact analysis to calculate the variation of an elastic approach amount of rolling element 24 that is caused by the damage.

Dynamics analysis model setting unit 210 receives the variety of data as described above that are input from input unit 110 and receives the variation of the approach amount calculated by approach amount variation calculation unit 205. Then, dynamics analysis model setting unit 210 sets a dynamics model of rolling bearing 20 for conducting a dynamics analysis taking into consideration the dynamic characteristics of rolling bearing 20. The dynamics analysis refers to a technique of formulating an equation of motion for each component (inner ring 22, rolling element 24, and outer ring 26) of rolling bearing 20 and integrating simultaneous ordinary differential equations along the time axis. The dynamics analysis enables real-time simulations of interference forces between the components, behaviors of the components, and the like that change with time.

For this dynamics analysis model, the variation of the approach amount calculated by approach amount variation calculation unit 205 is given. Each component of rolling bearing 20 is a rigid body, and rotational shaft 12 and housing 30 that are coupled to rolling bearing 20 are each an elastic body having a predetermined mass and a predetermined vibration mode. Influences of inertial forces of rolling bodies (inner ring 22, rolling elements 24, and rotational shaft 12) and the gravity acting on each component are reflected on the model.

Exciting force calculation unit 220 uses the dynamics analysis model set by dynamics analysis model setting unit 210 to calculate the history of the exciting force occurring to rolling bearing 20 when rolling bearing 20 is rotating. The exciting force is caused by a local change of the variation of the approach amount between the raceway and the rolling element given by the damage data which is input from input unit 110. More specifically, exciting force calculation unit 220 uses the aforementioned dynamics analysis model to calculate the history of the exciting force occurring to rolling bearing 20 due to a change of the approach amount between rolling element 24 and the raceway surface when rotational shaft 12 is being operated in accordance with the operating conditions that are input from input unit 110.

Meanwhile, vibration characteristics calculation unit 230 calculates, by a mode analysis program for analyzing a vibration mode of bearing device 10, a vibration characteristics model representing vibration transmission characteristics of bearing device 10. In the first embodiment, the so-called theory mode analysis is used to calculate, as a vibration characteristics model, a vibration mode representing vibration characteristics of bearing device 10. The mode analysis determines, based on the recognition that various vibrations are each made up of a plurality of natural modes, the natural modes and the natural frequencies. The theory mode analysis mathematically determines what vibration mode (eigenvalue information) a structure (elastic body) has. Specifically, the theory mode analysis determines the shape, the mass distribution, the rigidity distribution, and the constraint conditions of an object to be analyzed to produce a model of the object (bearing device 10) and, based on the mass matrix representing the mass characteristics of the model and the stiffness matrix representing the stiffness characteristics thereof, determines the eigenvalue and eigenvector by theoretical analysis or mathematical calculation, to accordingly determine the natural frequency and the natural mode of the object.

Vibration characteristics calculation unit 230 receives from input unit 110 characteristics data such as the shape, the density of the material, the Young's modulus, and the Poisson's ratio, of bearing device 10. Further, rolling element 24 is treated as a linear spring, and vibration characteristics calculation unit 230 receives from input unit 110 spring information for treating each of rolling element 24 and the coupling portion between housing 30 and base 40 (bolt coupling portion where they are coupled with bolts for example) as a linear spring. Then, vibration characteristics calculation unit 230 calculates a vibration characteristics model (vibration mode) of bearing device 10, by the mode analysis program (theory mode analysis program).

Regarding the above-described vibration characteristics model, in order to more accurately reproduce actual vibration characteristics, it is preferable that the bolt coupling portion (a coupling portion where housing 30 and base 40 are coupled to each other for example) is formed so that they are coupled to each other along only a part, which is located in the vicinity of the bolt, of the coupling surface of the bolt coupling portion. This is for the reason that the actual bolt coupling portion is formed to have a coupling surface in the vicinity of the bolt where they are coupled with a high compression force and a coupling surface away from the bolt where they are coupled with a relatively small force. This tendency is higher as the stiffness of parts coupled to each other with the bolt is lower. An example of the shape of the coupling portion in the vicinity of the bolt may be a ring shape which is concentric with the rotational axis of the bolt and has its inner diameter corresponding to the diameter of the bolt hole and its outer diameter corresponding to the diameter of the head of the bolt.

Vibration waveform calculation unit 240 uses the vibration characteristics model calculated by vibration characteristics calculation unit 230 to conduct a transient response analysis and thereby calculate a vibration waveform at a specified position (a location where a vibration sensor is to be placed for example) on bearing device 10. More specifically, vibration waveform calculation unit 240 receives from exciting force calculation unit 220, the variation of the approach amount calculated by approach amount variation calculation unit 205 and the history of the exciting force occurring to rolling bearing 20. Then, vibration waveform calculation unit 240 applies the history of the exciting force and the variation of the approach amount calculated by approach amount variation calculation unit 205 to the vibration characteristics model calculated by vibration characteristics calculation unit 230, to thereby calculate the vibration waveform at the time.

Here, in the first embodiment, the history of the exciting force calculated by exciting force calculation unit 220 is applied, in the vibration characteristics model calculated by vibration characteristics calculation unit 230, to at least one point on the central axis of inner ring 22 of rolling bearing 20. Accordingly, the prediction of the exciting force of rolling bearing 20 by means of the dynamics analysis program and the prediction of the vibration transmission characteristics of bearing device 10 by means of the mode analysis program can be combined together to conduct a precise vibration analysis.

To output unit 160, the vibration waveform calculated by vibration waveform calculation unit 240 is output. Output unit 160 may be a display indicating the vibration waveform, a write means for writing the data of the vibration waveform on a recording medium in a predetermined format, a communication device transmitting to the outside the data of the vibration waveform in a predetermined format, or the like.

Figure 4:
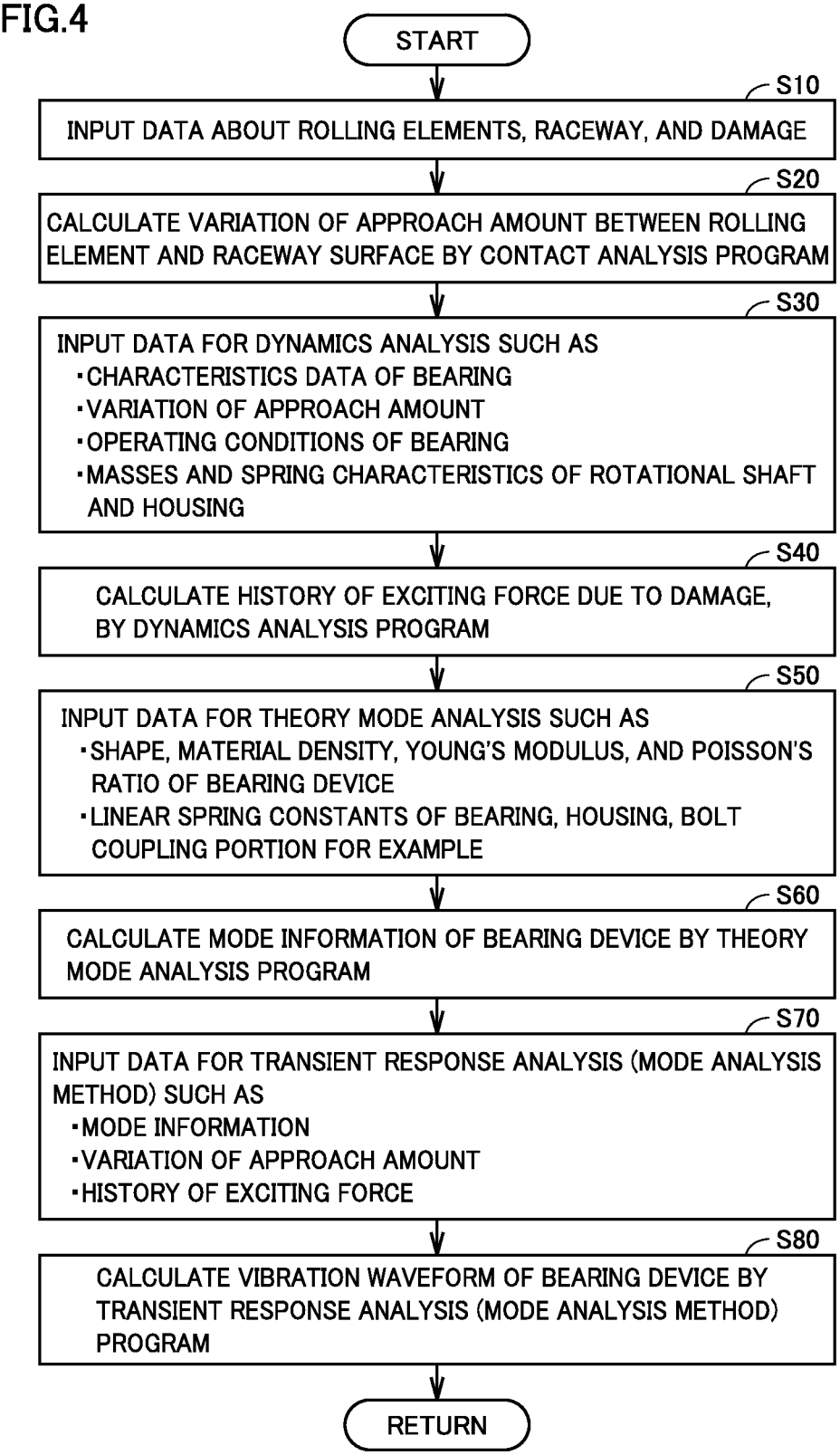
FIG. 4 is a flowchart for illustrating a process procedure of a vibration analysis method executed by the vibration analyzer shown in FIG. 2.

FIG. 4 is a flowchart for illustrating a process procedure of a vibration analysis method executed by vibration analyzer 100 shown in FIG. 2. Referring to FIG. 4, initially vibration analyzer 100 reads from input unit 110 the data about rolling elements 24 and their raceway (the outer circumferential surface of inner ring 22 and the inner circumferential surface of outer ring 26) as well as the data about a damage given to rolling bearing 20 (step S10).

Next, vibration analyzer 100 calculates, in accordance with a prepared contact analysis program, the variation of the approach amount between rolling element 24 and the raceway surface due to the damage which is input in step S10 (step S20). Then, vibration analyzer 100 reads a variety of data for conducting a dynamics analysis of rolling bearing 20 (step S30). Specifically, vibration analyzer 100 reads data from input unit 110, such as the characteristics data and the operating conditions of rolling bearing 20 as well as the masses and the spring characteristics of rotational shaft 12 and housing 30, and further reads the variation of the approach amount calculated in step S20.

Subsequently, vibration analyzer 100 sets a dynamics analysis model of rolling bearing 20 based on the variety of data read in step S30. Then, vibration analyzer 100 calculates, in accordance with a dynamics analysis program for which the dynamics analysis model is used, the history of the exciting force occurring to rolling bearing 20 due to the variation of the approach amount when rotational shaft 12 is operated under the operating conditions which are input in step S10 (step S40).

Next, vibration analyzer 100 reads a variety of data for conducting a theory mode analysis of bearing device 10 (step S50). Specifically, vibration analyzer 100 reads characteristics data such as the shape, the density of the material, the Young's modulus, and the Poisson's ratio, of bearing device 10. Vibration analyzer 100 also reads spring information for treating each of rolling element 24 and the coupling portion between housing 30 and base 40 (bolt coupling portion where they are coupled with bolts for example) as a linear spring. Each of the above data may be read from input unit 110 or may be held in advance as internal data.

In response to input of each data in step S50, vibration analyzer 100 calculates mode information of bearing device 10 in accordance with a prepared theory mode analysis program (step S60). Specifically, based on each data which is input in step S50, vibration analyzer 100 calculates the vibration mode (natural frequency and natural mode) of bearing device 10 by means of the theory mode analysis program.

Next, vibration analyzer 100 reads a variety of data for conducting a transient response analysis (mode analysis method) of bearing device 10 (step S70). Specifically, vibration analyzer 100 reads the mode information calculated in step S60, the variation of the approach amount calculated in step S20, and the history of the exciting force of rolling bearing 20 calculated in step S40, for example.

Then, in accordance with a prepared transient response analysis (mode analysis method) program, vibration analyzer 100 calculates the vibration waveform of bearing device 10 (step S80). Specifically, vibration analyzer 100 applies the history of the exciting force calculated in step S40 to at least one point on the central axis of inner ring 22 of bearing device 10 having the vibration mode calculated in step S60, to thereby calculate the vibration waveform occurring to bearing device 10 due to the exciting force calculated in step S40.

In this way, by vibration analyzer 100, the vibration waveform of bearing device 10 when damage occurs in rolling bearing 20 can be simulated. Accordingly, by means of vibration analyzer 100, a threshold can be determined for making a determination about an abnormality of the bearing by a condition monitoring system which monitors the condition (abnormality) of the rolling bearing, and the condition monitoring system can use this threshold value to make a determination about an abnormality of the rolling bearing.

In the following, as to the rolling bearing condition monitoring system by which the threshold value is used for making a determination about an abnormality of the bearing that is determined from the results of the analysis by vibration analyzer 100, a rolling bearing condition monitoring system in a wind power generation facility will exemplarily be described by way of example.

Overall Configuration of Wind Power Generation Facility

Figure 5:
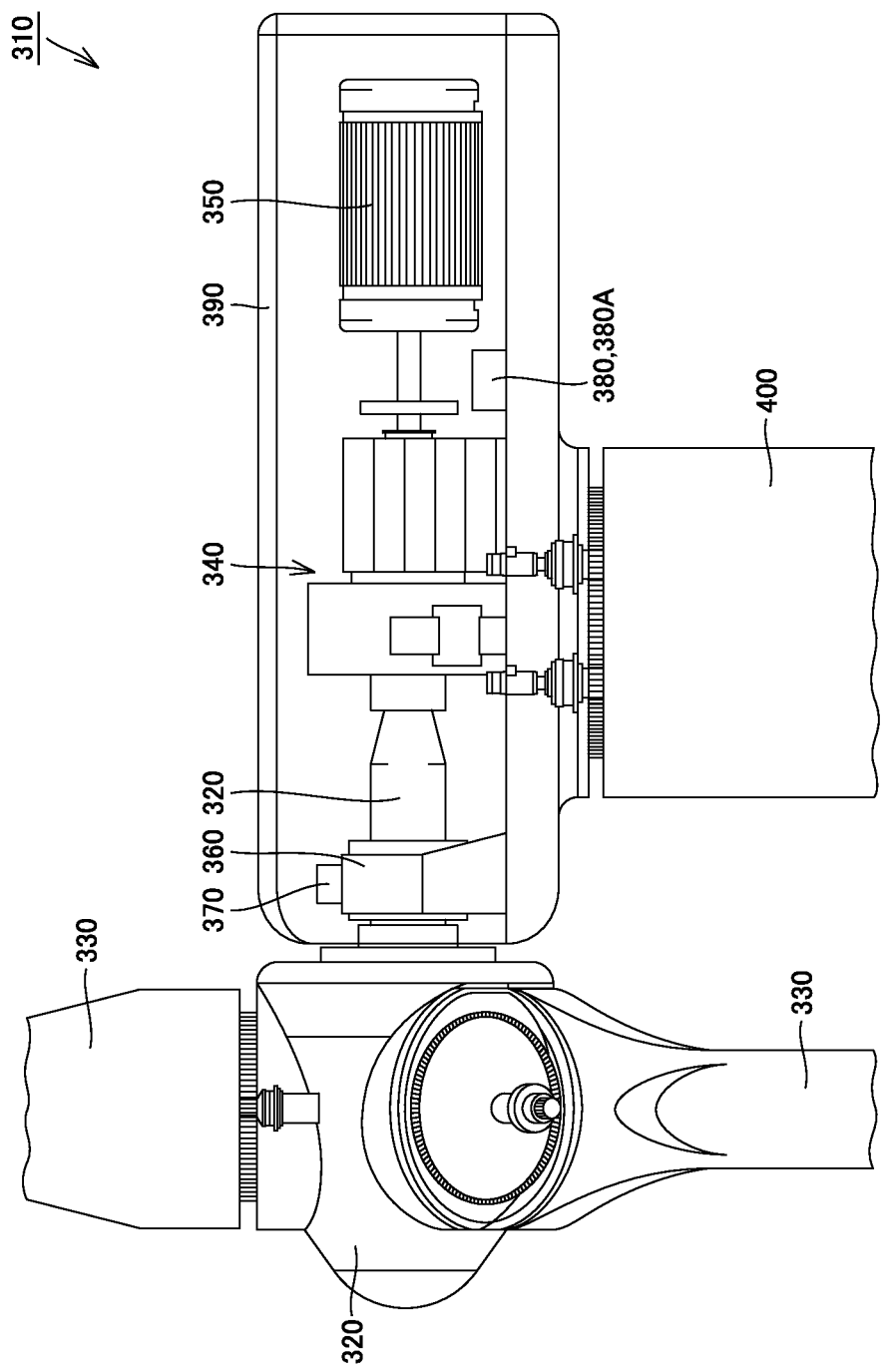
FIG. 5 is a diagram schematically showing a configuration of a wind power generation facility to which a rolling bearing condition monitoring system is applied.

FIG. 5 is a diagram schematically showing a configuration of a wind power generation facility to which the rolling bearing condition monitoring system is applied. Referring to FIG. 5, a wind power generation facility 310 includes a main shaft 320, a blade 330, a speed increaser 340, a generator 350, a main-shaft bearing device (hereinafter simply referred to as "bearing device") 360, a vibration sensor 370, and a data processor 380. Speed increaser 340, generator 350, bearing device 360, vibration sensor 370, and data processor 380 are contained in a nacelle 390, and nacelle 390 is supported by a tower 400.

Main shaft 320 extends into nacelle 390 to be connected to an input shaft of speed increaser 340 and rotatably supported by bearing device 360. Main shaft 320 transmits to the input shaft of speed increaser 340 a rotational torque generated by blade 330 receiving wind power. Blade 330 is located at the foremost end of main shaft 320, converts the wind power into a rotational torque, and transmits it to main shaft 320.

Bearing device 360 is fixed in nacelle 390 and rotatably supports main shaft 320. Bearing device 360 is made up of a rolling bearing and a housing, and the rolling bearing is herein formed of a ball bearing. Vibration sensor 370 is fixed to bearing device 360. Then, vibration sensor 370 detects vibration of bearing device 360 and outputs the detected value of vibration to data processor 380. Vibration sensor 370 is formed of an acceleration sensor for which a piezoelectric element is used for example.

Speed increaser 340 is provided between main shaft 320 and generator 350 for increasing the rotational speed of main shaft 320 and outputting it to generator 350. By way of example, speed increaser 340 is formed of a speed-up gear mechanism including a planetary gear, an intermediate shaft, and a high-speed shaft, for example. The inside of speed increaser 340 is also provided with a plurality of bearings rotatably supporting a plurality of shafts which, however, are not particularly shown. Generator 350 is connected to an output shaft of speed increaser 340 for generating electric power from the rotational torque received from speed increaser 340. Generator 350 is formed for example of an induction generator. The inside of generator 350 is also provided with a bearing rotatably supporting a rotor.

Data processor 380 is provided in nacelle 390 and receives from vibration sensor 370 the detected value of vibration of bearing device 360. In accordance with a preset program, data processor 380 diagnoses an abnormality of bearing device 360 by means of the vibration waveform of bearing device 360.

Figure 6:
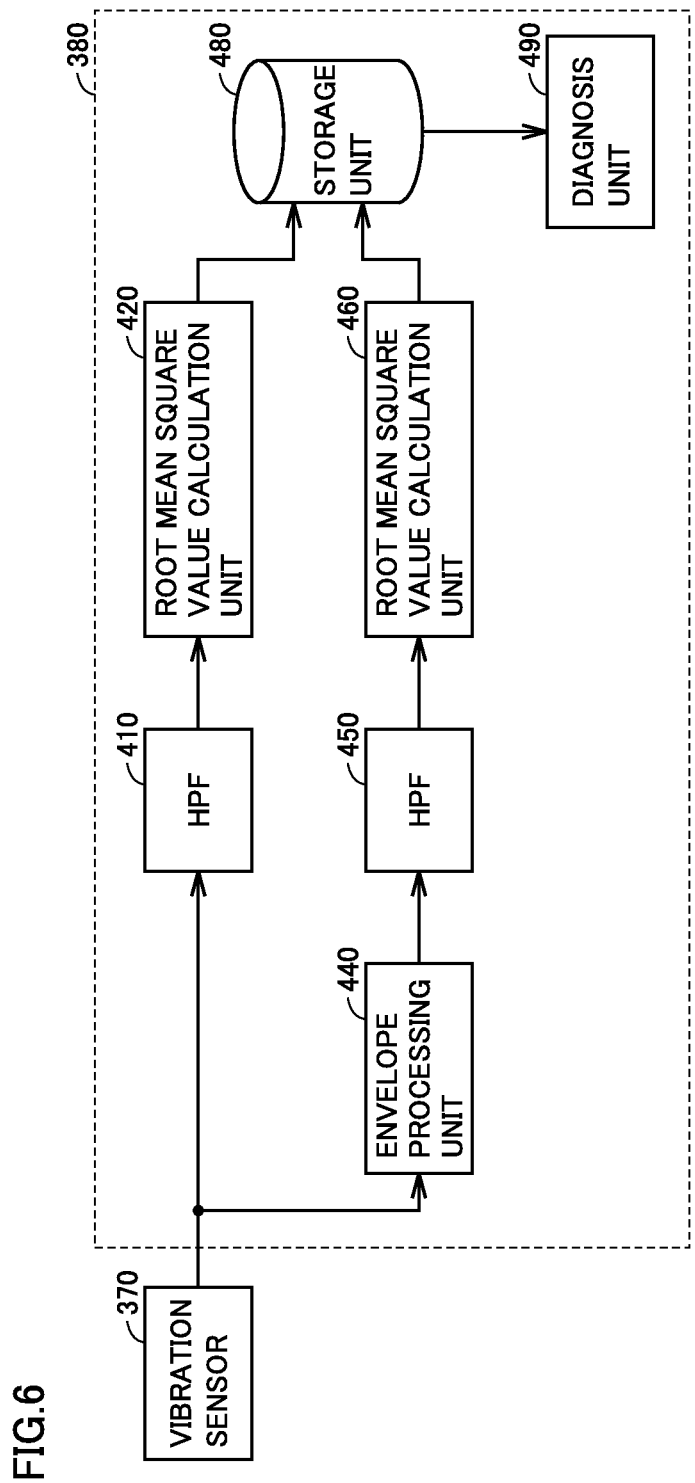
FIG. 6 is a functional block diagram functionally showing a configuration of a data processor shown in FIG. 5.

FIG. 6 is a functional block diagram functionally showing a configuration of data processor 380 shown in FIG. 5. Referring to FIG. 6, data processor 380 includes high-pass filters (hereinafter referred to as "HPF") 410, 450, root mean square value calculation units 420, 460, an envelope processing unit 440, a storage unit 480, and a diagnosis unit 490.

HPF 410 receives from vibration sensor 370 the detected value of vibration of bearing device 360. HPF 410 then passes a signal component of the received detected signal that is higher than a predetermined frequency, and blocks a low-frequency component thereof. HPF 410 is provided for removing a DC component included in the vibration waveform of bearing device 360. If the output of vibration sensor 370 does not include a DC component, HPF 410 may not be provided.

Root mean square value calculation unit 420 receives from HPF 410 the vibration waveform of bearing device 360 from which the DC component has been removed. Then, root mean square value calculation unit 420 calculates a root mean square value (also referred to as "RMS value") of the vibration waveform of bearing device 360, and outputs the calculated root mean square value of the vibration waveform to storage unit 480.

Envelope processing unit 440 receives the detected value of vibration of bearing device 360 from vibration sensor 370. Then, envelope processing unit 440 performs envelope processing on the received detected signal to thereby generate an envelope waveform of the vibration waveform of bearing device 360. To the envelope processing operated by envelope processing unit 440, any of a variety of known techniques is applicable. By way of example, the vibration waveform of bearing device 360 which is measured with vibration sensor 370 is rectified to an absolute value and passed through a low-pass filter (LPF) to thereby generate the envelope waveform of the vibration waveform of bearing device 360.

HPF 450 receives from envelope processing unit 440 the envelope waveform of the vibration waveform of bearing device 360. Then, HPF 450 passes a signal component of the received envelope waveform that is higher than a predetermined frequency and blocks a low-frequency component thereof. HPF 450 is provided for removing a DC component included in the envelope waveform and extracting an AC component of the envelope waveform.

Root mean square value calculation unit 460 receives from HPF 450 the envelope waveform from which the DC component has been removed, namely the AC component of the envelope waveform. Then, root mean square value calculation unit 460 calculates the root mean square value (RMS value) of the AC component of the received envelope waveform, and outputs to storage unit 480 the root mean square value of the AC component of the calculated envelope waveform.

Storage unit 480 stores from moment to moment the root mean square value of the vibration waveform of bearing device 360 calculated by root mean square value calculation unit 420 and the root mean square value of the AC component of the envelope waveform thereof calculated by root mean square value calculation unit 460 in synchronization with each other. Storage unit 480 may for example be formed of a readable/writable nonvolatile memory or the like.

Diagnosis unit 490 reads from storage unit 480 the root mean square value of the vibration waveform of bearing device 360 and the root mean square value of the AC component of the envelope waveform thereof that are stored from moment to moment in storage unit 480, and diagnoses an abnormality of bearing device 360, based on the two read root mean square values. Specifically, diagnosis unit 490 diagnoses an abnormality of bearing device 360, based on the transition of the change with time of the root mean square value of the vibration waveform of bearing device 360 and the root mean square value of the AC component of the envelope waveform thereof.

Namely, the root mean square value of the vibration waveform of bearing device 360 calculated by root mean square value calculation unit 420 is the root mean square value of the original vibration waveform on which envelope processing is not done. Therefore, in the case for example of impulse-like vibration where peeling occurs to a part of the race and the amplitude increases only when the rolling element passes the site of peeling, an increase of this value is small. In the case, however, of continuous vibration which occurs due to surface roughness of the contact portion between the race and the rolling element or due to insufficient lubrication, an increase of this value is large.

In contrast, as for the root mean square value of the AC component of the envelope waveform calculated by root mean square value calculation unit 460, an increase of this value is small in the case of continuous vibration which occurs due to surface roughness or insufficient lubrication of the race, while an increase of this value is large in the case of impulse-like vibration. The value, however, may not increase in some cases. In view of this, the root mean square value of the vibration waveform of bearing device 360 and the root mean square value of the AC component of the envelope waveform thereof are used to enable detection of an abnormality that cannot be detected with only one of the root mean square values, and enable more correct diagnosis of an abnormality to be achieved.

FIGS. 7 to 10 are each a diagram showing a vibration waveform of bearing device 360 measured with vibration sensor 370. In FIGS. 7 to 10 each, the vibration waveform at the time when the rotational speed of main shaft 320 (FIG. 5) is constant is shown.

Figure 7:
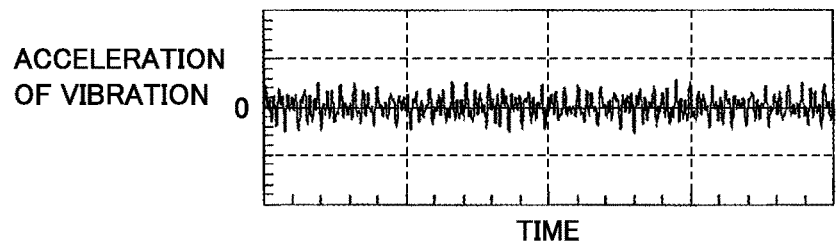
FIG. 7 is a diagram showing a vibration waveform of a bearing device when no abnormality occurs to the bearing device.

FIG. 7 is a diagram showing a vibration waveform of bearing device 360 when no abnormality occurs to bearing device 360. Referring to FIG. 7, the horizontal axis represents the time and the vertical axis represents an indicator of the magnitude of vibration. Here, the vertical axis represents the acceleration of vibration by way of example.

Figure 8:
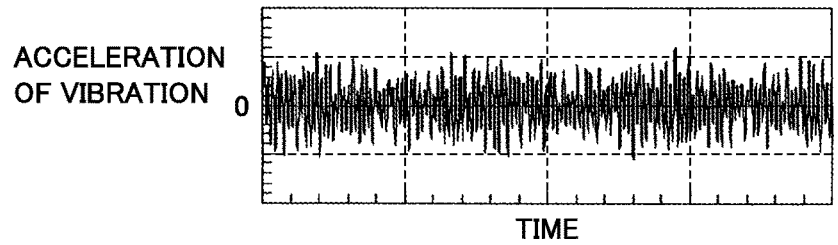
FIG. 8 is a diagram showing a vibration waveform of a bearing device exhibited when surface roughness or insufficient lubrication occurs to a race of the bearing device.

FIG. 8 is a diagram showing a vibration waveform of bearing device 360 exhibited when surface roughness or insufficient lubrication occurs to a race of bearing device 360. Referring to FIG. 8, when surface roughness or insufficient lubrication occurs to the race, the acceleration increases and the state where the acceleration is increased occurs continuously. No conspicuous peak occurs to the vibration waveform. Therefore, as to such a vibration waveform, the root mean square value of the original vibration waveform on which envelope processing is not done exhibits an increase while the root mean square value of the AC component of the envelope waveform does not exhibit such an increase, as compared with the root mean square value (the output of root mean square value calculation unit 420 (FIG. 6)) of the vibration waveform and the root mean square value (the output of root mean square value calculation unit 460 (FIG. 6)) of the AC component of the envelope waveform that are exhibited when no abnormality occurs to bearing device 360.

Figure 9:
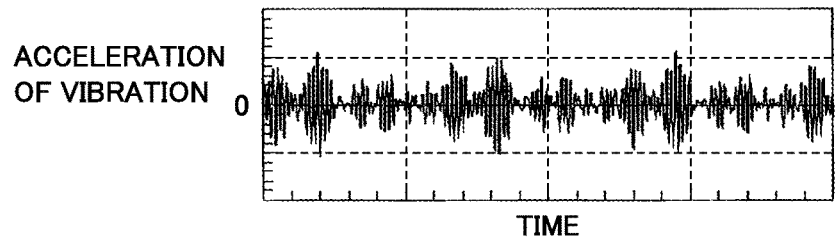
FIG. 9 is a diagram showing a vibration waveform of a bearing device in an initial stage of occurrence of peeling to a race of the bearing device.

FIG. 9 is a diagram showing a vibration waveform of bearing device 360 in an initial stage of occurrence of peeling to a race of bearing device 360. Referring to FIG. 9, in the initial stage of the peeling abnormality, peeling occurs to a part of the race and large vibration is generated when the rolling element passes the site of peeling. Therefore, pulse-like vibration periodically occurs with rotation of the shaft. While the rolling element passes the site other than the site of peeling, the increase of the acceleration is small. Therefore, as to such a vibration waveform, the root mean square value of the AC component of the envelope waveform exhibits an increase while the root mean square value of the original vibration waveform does not exhibit such an increase, as compared with the root mean square value of the vibration waveform and the root mean square value of the AC component of the envelope waveform that are exhibited when no abnormality occurs to bearing device 360.

Figure 10:
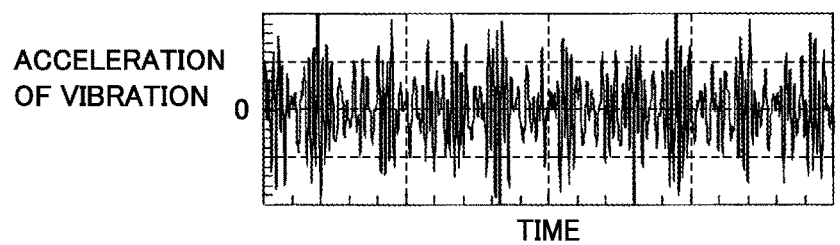
FIG. 10 is a diagram showing a vibration waveform of a bearing device exhibited in a terminal stage of a peeling abnormality.

FIG. 10 is a diagram showing a vibration waveform of bearing device 360 exhibited in a terminal stage of the peeling abnormality. Referring to FIG. 10, the terminal stage of the peeling abnormality is a state where peeling is transferred to the whole area of the race and the acceleration increases as a whole while the variation of the amplitude of the acceleration decreases, as compared with the initial stage of the peeling abnormality. Therefore, as to such a vibration waveform, the root mean square value of the original vibration waveform increases while the root mean square value of the AC component of the envelope waveform decreases, as compared with the root mean square value of the vibration waveform and the root mean square value of the AC component of the envelope waveform that are exhibited in the initial stage of the peeling abnormality.

Figure 11:
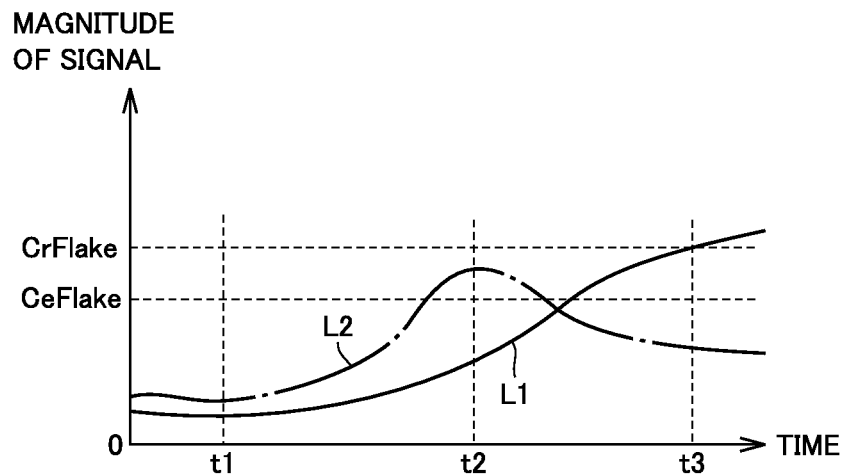
FIG. 11 is a diagram showing changes with time of a root mean square value of a vibration waveform of a bearing device and a root mean square value of an AC component of an envelope waveform thereof that are exhibited when peeling occurs to a part of a race of the bearing device and the peeling is thereafter transferred to the whole area of the race.

FIG. 11 is a diagram showing changes with time of the root mean square value of the vibration waveform of bearing device 360 and the root mean square value of the AC component of the envelope waveform thereof that are exhibited when peeling occurs to a part of the race of bearing device 360 and the peeling is thereafter transferred to the whole area of the race. In this FIG. 11 and FIG. 12 described below, a change with time of each root mean square value while the rotational speed of main shaft 320 is constant is shown.

Referring to FIG. 11, a curve L1 represents the change with time of the root mean square value of the vibration waveform on which envelope processing is not done, and a curve L2 represents the change with time of the root mean square value of the AC component of the envelope waveform. At time t1 before occurrence of peeling, both the root mean square value (L1) of the vibration waveform and the root mean square value (L2) of the AC component of the envelope waveform are small. The vibration waveforms at time t1 are like the waveform shown in FIG. 7 described above.

When peeling occurs to a part of the race of bearing device 360, the root mean square value (L2) of the AC component of the envelope waveform increases to a significant degree while the root mean square value (L1) of the vibration waveform on which envelope processing is not done does not increase to such a significant degree (in the vicinity of time t2) as described above with reference to FIG. 9.

Further, when the peeling is thereafter transferred to the whole area of the race, the root mean square value (L1) of the vibration waveform on which envelope processing is not done increases significantly while the root mean square value (L2) of the AC component of the envelope waveform decreases (in the vicinity of time t3), as described above with reference to FIG. 10.

Figure 12:
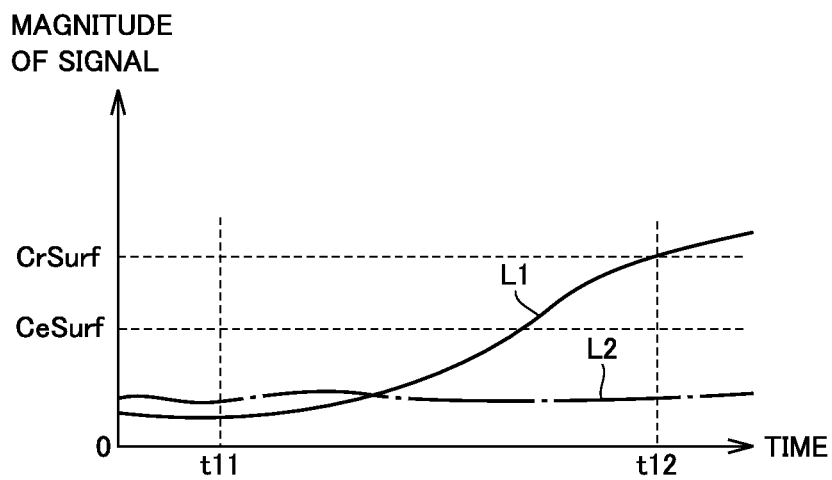
FIG. 12 is a diagram showing changes with time of a root mean square value of a vibration waveform of a bearing device and a root mean square value of an AC component of an envelope waveform thereof that are exhibited when surface roughness or insufficient lubrication occurs to a race of the bearing device.

FIG. 12 is a diagram showing changes with time of the root mean square value of the vibration waveform of bearing device 360 and the root mean square value of the AC component of the envelope waveform thereof that are exhibited when surface roughness or insufficient lubrication occurs to the race of bearing device 360. Referring to FIG. 12, in FIG. 12 like FIG. 11, a curve L1 represents the change with time of the root mean square value of the vibration waveform on which envelope processing is not done, and a curve L2 represents the change with time of the root mean square value of the AC component of the envelope waveform.

At time t11 before occurrence of the surface roughness or insufficient lubrication of the race, both the root mean square value (L1) of the vibration waveform and the root mean square value (L2) of the AC component of the envelope waveform are small. The vibration waveform at time t11 is like the waveform shown in FIG. 7 described above.

When surface roughness or insufficient lubrication occurs to the race of bearing device 360, the root mean square value (L1) of the vibration waveform on which envelope processing is not done increases while the root mean square value (L2) of the AC component of the envelope waveform does not increase (in the vicinity of time t12), as described above with reference to FIG. 8.

As seen from the above, based on the root mean square value of the vibration waveform of bearing device 360 measured with vibration sensor 370 and the root mean square value of the AC component of the envelope waveform which is generated by envelope processing of the vibration waveform measured with vibration sensor 370, the abnormality of bearing device 360 can be diagnosed.

Accordingly, a more accurate abnormality diagnosis can be conducted relative to the conventional technique based on frequency analysis.

It is necessary for execution of such an abnormality diagnosis to appropriately set the threshold value of vibration for conducting the abnormality diagnosis. This threshold value can be determined by means of vibration analyzer 100 as described above. Namely, vibration analyzer 100 can provide a model of bearing device 360 and provide damage data about the bearing to thereby predict the vibration waveform at a location where vibration sensor 370 is placed on bearing device 360. Then, the root mean square value of the vibration waveform as well as the root mean square value of the AC component of the envelope waveform generated by envelope processing of the vibration waveform can be calculated to thereby appropriately determine the threshold value used for making a determination about an abnormality by the condition monitoring system.

It should be noted that a change of the rotational speed of main shaft 320 (FIG. 5) causes a change of the magnitude of vibration of bearing device 360. In general, the vibration of bearing device 360 increases with the increase of the rotational speed of main shaft 320. In view of this, each of the root mean square value of the vibration waveform of bearing device 360 and the root mean square value of the AC component of the envelope waveform thereof may be normalized with the rotational speed of main shaft 320, and each of the normalized root mean square values may be used to execute an abnormality diagnosis for bearing device 360.

Figure 13:
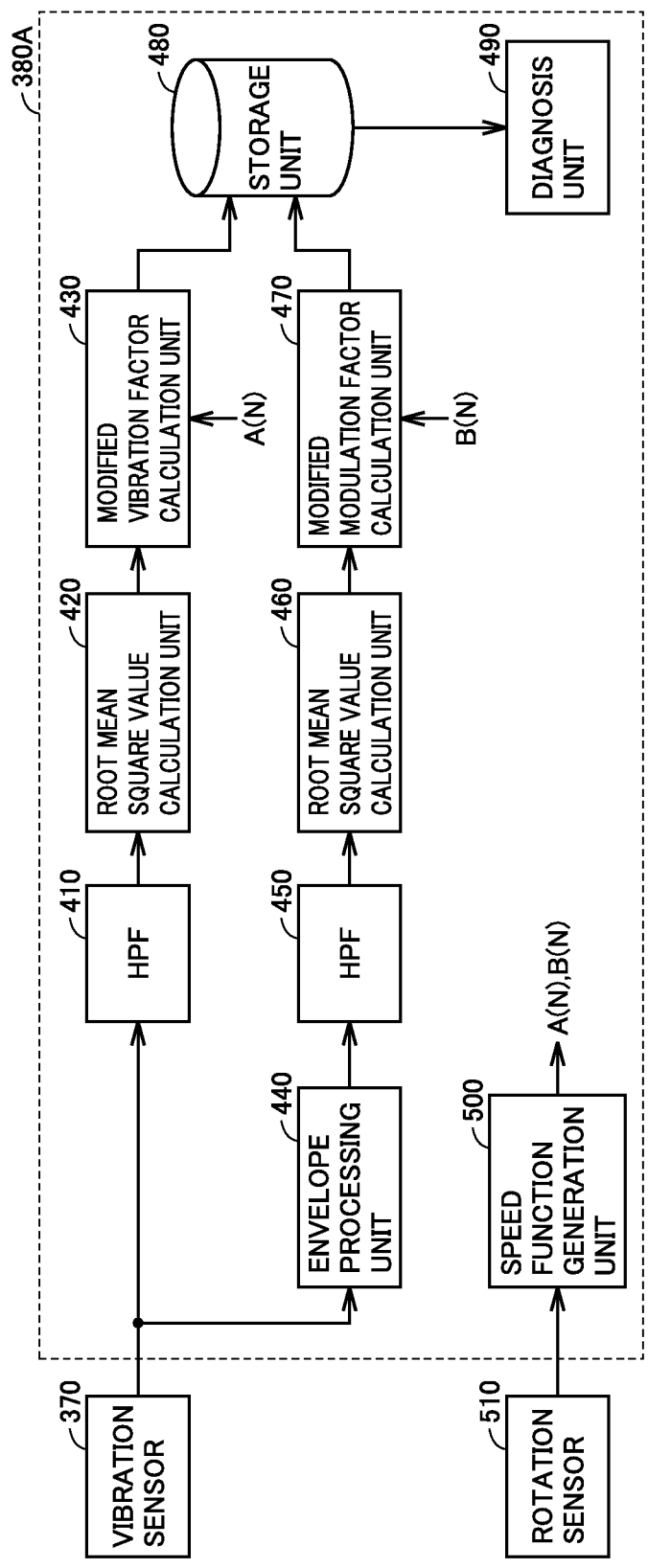
FIG. 13 is a functional block diagram functionally showing another configuration of the data processor.

FIG. 13 is a functional block diagram functionally showing another configuration of the data processor. Referring to FIG. 13, a data processor 380A further includes, relative to the configuration of data processor 380 shown in FIG. 6, a modified vibration factor calculation unit 430, a modified modulation factor calculation unit 470, and a speed function generation unit 500.

Speed function generation unit 500 receives a detected value of the rotational speed of main shaft 320 detected by a rotation sensor 510 (not shown in FIG. 5). Rotation sensor 510 may output the detected value of the rotational position of main shaft 320 and speed function generation unit 500 may then calculate the rotational speed of main shaft 320. Speed function generation unit 500 generates a speed function A(N) for normalizing, with rotational speed N of main shaft 320, the root mean square value of the vibration waveform of bearing device 360 calculated by root mean square value calculation unit 420, and a speed function B(N) for normalizing, with rotational speed N of main shaft 320, the root mean square value of the AC component of the envelope waveform calculated by root mean square value calculation unit 460. By way of example, speed functions A(N), B(N) are represented by the following formulas:

$$A(N) = a \times N^{-0.5} \quad (1)$$

$$B(N) = b \times N^{-0.5} \quad (2)$$

where a, b are constants determined in advance through an experiment or the like, and may be values different from or identical to each other.

Modified vibration factor calculation unit 430 receives the root mean square value of the vibration waveform of bearing device 360 from root mean square value calculation unit 420 and receives speed function A(N) from speed function generation unit 500. Then, modified vibration factor calculation unit 430 uses speed function A(N) to calculate a value (hereinafter also referred to as "modified vibration factor") by normalizing, with the rotational speed of main shaft 320, the root mean square value of the vibration waveform calculated by root mean square value calculation unit 420. Specifically, root mean square value Vr of the vibration waveform calculated by root mean square value calculation unit 420 and speed function A(N) are used to calculate modified vibration factor Vr* in accordance with the following formula.

$$Vr^* = A(N)\sqrt{\frac{\int_0^T \{Vr(t) - Vra\}^2 dt}{T}} \quad (3)$$

Here, Vra represents an average of Vr in time 0 to T. Then, modified vibration factor calculation unit 430 outputs to storage unit 480 modified vibration factor Vr* calculated in accordance with formula (3).

Modified modulation factor calculation unit 470 receives the root mean square value of the AC component of the envelope waveform from root mean square value calculation unit 460 and receives speed function B(N) from speed function generation unit 500. Then, modified modulation factor calculation unit 470 uses speed function B(N) to calculate a value (hereinafter also referred to as "modified modulation factor") by normalizing, with the rotational speed of main shaft 320, the root mean square value of the AC component of the envelope waveform calculated by root mean square value calculation unit 460. Specifically, root mean square value Ve of the AC component of the envelope waveform calculated by root mean square value calculation unit 460 and speed function B(N) are used to calculate modified modulation factor Ve* in accordance with the following formula.

$$Ve^* = B(N)\sqrt{\frac{\int_0^T \{Ve(t) - Vea\}^2 dt}{T}} \quad (4)$$

Here, Vea is an average of Ve in time 0 to T. Modified modulation factor calculation unit 470 outputs to storage unit 480 modified modulation factor Ve* calculated in accordance with formula (4).

Then, modified vibration factor Vr* and modified modulation factor Ve* stored from moment to moment in storage unit 480 are read by diagnosis unit 490. Based on the transition of the change with time of the read modified vibration factor Vr* and modified modulation factor Ve*, diagnosis unit 490 conducts an abnormality diagnosis of bearing device 360.

It should be noted that the above-described rotation sensor 510 may be attached to main shaft 320 or a rotation-sensor-incorporated bearing which is bearing device 360 in which rotation sensor 510 is incorporated may be used as bearing device 360.

With the configuration as described above, an abnormality is diagnosed based on modified vibration factor Vr* which is determined by normalizing the root mean square value of the vibration waveform of bearing device 360 with the rotational speed, and modified modulation factor Ve* which is determined by normalizing the root mean square value of the AC component of the envelope waveform with the rotational speed. Therefore, disturbance due to variation of the rotational speed is removed and accordingly a more accurate abnormality diagnosis is implemented.

In the first embodiment as seen from the above, damage data about rolling bearing 20 to be analyzed is input to vibration analyzer 100, and the dynamics analysis program is used to calculate the history of the exciting force which occurs to the rolling bearing due to damage when the rotational shaft of rolling bearing 20 is rotated. Then, to the vibration characteristics model of bearing device 10 calculated by the mode analysis program, the history of the exciting force is applied, and the vibration waveform at a predetermined position (the location where the vibration sensor is placed for example) on bearing device 10 is calculated. Accordingly, the vibration waveform of bearing device 10 when damage occurs in the bearing can be predicted. Thus, in accordance with the first embodiment, the results of the prediction can be used by the condition monitoring system of the rolling bearing (bearing device 360) applied to wind power generation facility 310 for example, to appropriately determine the threshold value for making a determination about an abnormality of the rolling bearing.

By way of example, the modified vibration factor and the modified modulation factor measured in an initial normal state of a wind power generation facility are Vr*0 and Ve*0, respectively. Regarding a determination of whether peeling occurs as described above with reference to FIG. 11, when it is confirmed that a rate of increase Ie of the modified modulation factor from the initial state (=Ve*/Ve*0) exceeds a threshold value CeFlake of the modified modulation factor which is used for determining whether peeling occurs and thereafter a rate of increase Ir of the modified vibration factor from the initial state (=Vr*/Vr*0) exceeds a threshold value CrFlake of the modified vibration factor which is used for determining whether peeling occurs, it is determined that peeling occurs. Regarding a determination of whether surface roughness or insufficient lubrication occurs as described above with reference to FIG. 12, when it is confirmed that the rate of increase Ie of the modified modulation factor remains smaller than threshold value CeSurf of the modified modulation factor which is used for determining whether surface roughness occurs while the rate of increase Ir of the modified vibration factor exceeds threshold value CrSurf of the modified vibration factor which is used for determining whether surface roughness occurs, then, it is determined that surface roughness or insufficient lubrication occurs. The threshold values in this case are four threshold values, namely CeFlake, CrFlake, CeSurf, CrSurf.

It should be noted that the above-described threshold values and the determination about an abnormality for which the threshold values are used are given by way of example, and more complicated pattern recognition or the like may alternatively be used. A temperature sensor may additionally be used to distinguish between surface roughness and insufficient lubrication. In any case, it is necessary to use the threshold values for making a determination about an abnormality in the condition where vibration increases.

Further, in vibration analyzer 100, the history of the exciting force which occurs due to given damage is applied to at least one point on the central axis of inner ring 22 of rolling bearing 20. Thus, the prediction of the exciting force of rolling bearing 20 by means of the dynamics analysis program and the prediction of the vibration transmission characteristics of bearing device 10 by means of the mode analysis program can be combined together to conduct a precise vibration analysis.

Modification

According to the above description, the mode analysis method is used for the transient response analysis when the vibration characteristics of bearing device 10 are analyzed. Instead of the mode analysis method, however, a direct integral method may be used. The direct integral method is a technique of successively integrating the calculated variation of the approach amount between the rolling element and the raceway surface and the calculated history of the exciting force, and is effective in the case where vibration analyzer 100 has adequate arithmetic processing ability.

Figure 14:
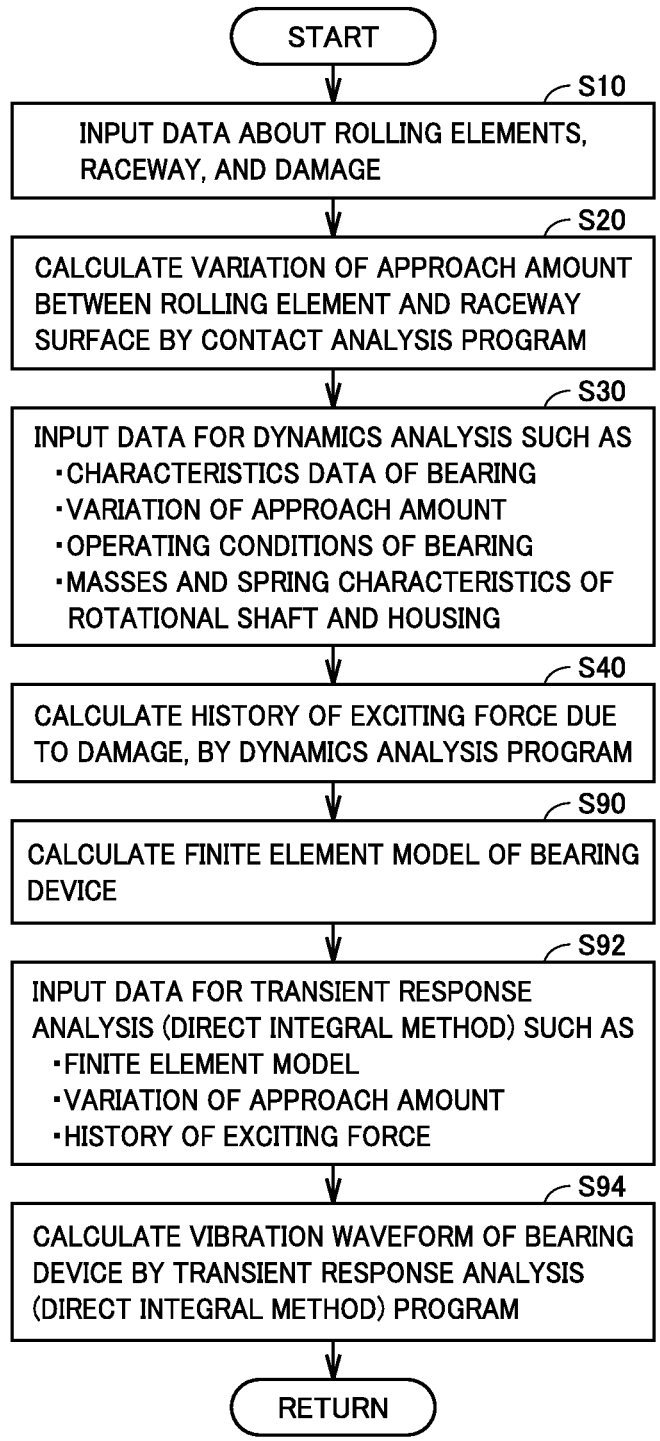
FIG. 14 is a flowchart for illustrating a process procedure of a vibration analysis method executed by a vibration analyzer according to a modification.

FIG. 14 is a flowchart for illustrating a process procedure of a vibration analysis method executed by vibration analyzer 100 according to this modification. Referring to FIG. 14, this flowchart corresponds to the flowchart shown in FIG. 4 except that the former includes steps S90 to S94 instead of steps S50 to S80 of FIG. 4.

Namely, after the history of the exciting force occurring to rolling bearing 20 is calculated in step S40, vibration analyzer 100 calculates a finite element model of bearing device 10 based on characteristics data of bearing device 10 (including the shape, the material density, the Young's modulus, and the Poisson's ratio, for example, of bearing device 10) (step S90). Subsequently, vibration analyzer 100 reads a variety of data for executing a transient response analysis (direct integral method) of bearing device 10 (step S92). Specifically, vibration analyzer 100 reads the finite element model calculated in step S90, the variation of the approach amount calculated in step S20, and the history of the exciting force of rolling bearing 20 calculated in step S40, for example.

Then, vibration analyzer 100 calculates the vibration waveform of bearing device 10 in accordance with the prepared transient response analysis (direct integral method) program (step S94). Specifically, vibration analyzer 100 applies the history of the exciting force calculated in step S40 to at least one point on the central axis of inner ring 22 of bearing device 10 shown by the finite element model calculated in step S90 to thereby calculate the vibration waveform occurring to bearing device 10 due to the exciting force calculated in step S40.

Second Embodiment

In the above-described first embodiment and its modification, rolling bearing 20 is formed of a ball bearing. A second embodiment will be described regarding the case where rolling bearing 20 is formed of a roller bearing.

In the case where rolling bearing 20 is formed of a roller bearing, the history of the exciting force occurring to rolling bearing 20 is calculated by a dynamics analysis model for which the so-called slice method is used. The slice method is characterized by that the contact load is calculated for each of minute-width sections obtained by slicing a contact portion between a roller and the raceway surface along the axial direction of the roller, into sections each having a minute width.

Figure 15:
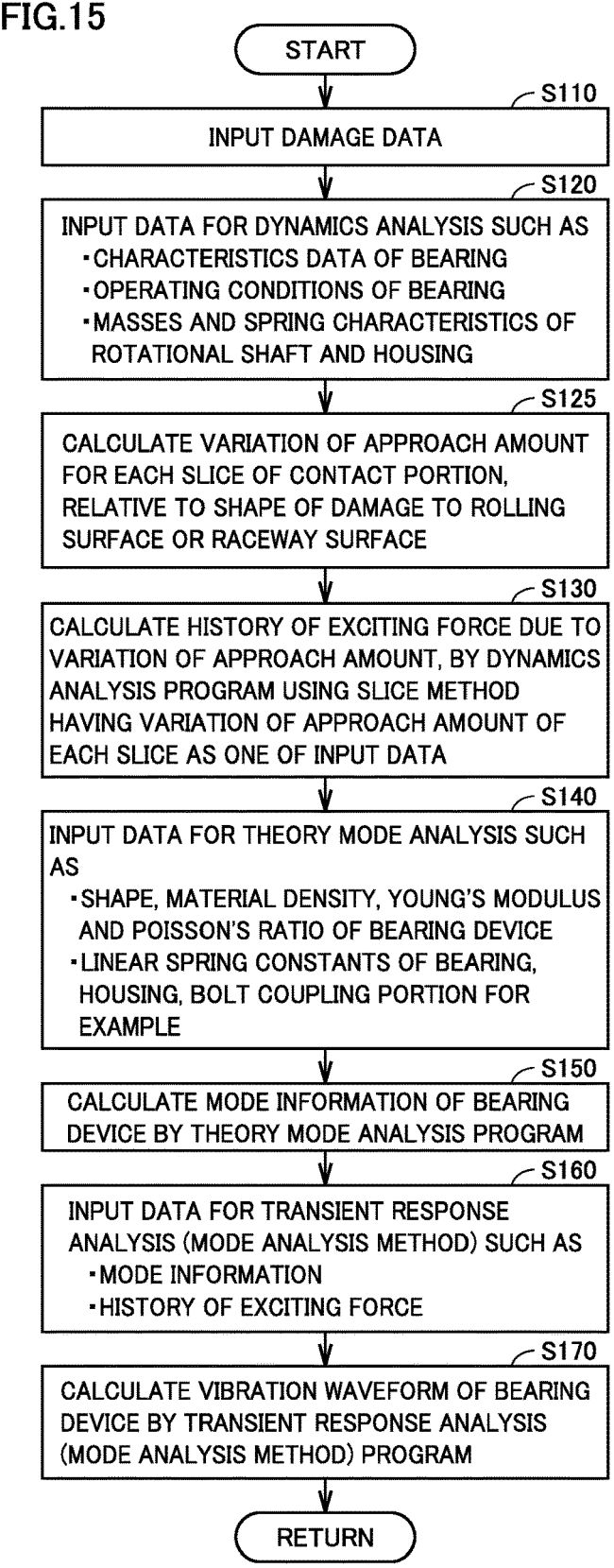
FIG. 15 is a flowchart for illustrating a process procedure of a vibration analysis method executed by a vibration analyzer according to a second embodiment.

FIG. 15 is a flowchart for illustrating a process procedure of the vibration analysis method executed by vibration analyzer 100 according to the second embodiment. Referring to FIG. 15, initially vibration analyzer 100 reads from input unit 110 data about rolling elements 24 and their raceway as well as damage which is the data about damage given to rolling bearing 20 (step S110).

Subsequently, vibration analyzer 100 reads a variety of data for conducting the dynamics analysis (step S120). Specifically, vibration analyzer 100 reads data from input unit 110, such as the characteristics data, the shape of damage, and the operating conditions of rolling bearing 20, as well as data about the masses and the spring characteristics of rotational shaft 12 and housing 30.

Then, after a variety of data is read in step S120, vibration analyzer 100 converts, for each slice of the contact portion between the roller and the raceway surface, the shape of damage to the variation of the approach amount between the roller and the raceway surface (step S125). Here, this conversion is done using, as main variables, the load within the slice and the width, in the rolling direction, of the shape of damage. For this conversion, contact between cylindrical objects may be studied in advance. More specifically, the influence of the rolling-direction width of a depressed portion that is exerted on the relation between the load and the variation of the approach amount may be studied and defined in the form of a function in advance. Then, in accordance with the dynamics analysis program by means of the slice method to which applied the variation of the approach amount of each slice, vibration analyzer 100 calculates the history of the exciting force which occurs to rolling bearing 20 due to the damage which is input in step S110 when rotational shaft 12 is operated under the operating conditions which are input in step S120 (step S130).

The process in the subsequent steps S140 to S170 is basically identical to the process in steps S50 to S80 shown in FIG. 4, and therefore, the description thereof will not be repeated.

According to the second embodiment as seen from the above, the vibration waveform of bearing device 10 in the case where damage occurs in the bearing can be predicted, even in the case where rolling bearing 20 is formed of a roller bearing. Consequently, for the condition monitoring system of the rolling bearing applied to a wind power generation facility or the like, the threshold value can appropriately be determined for making a determination about an abnormality of the rolling bearing.

Third Embodiment

In the first and second embodiments as described above, the history of the exciting force, which occurs to rolling bearing 20 when the rotational shaft of rolling bearing 20 is rotated, is calculated by the dynamics analysis program, the calculated history of the exciting force is applied to the vibration characteristics model of bearing device 10, and accordingly, a vibration waveform of bearing device 10 is obtained.

In contrast, in the third embodiment, the so-called mode synthesis method is used to introduce vibration characteristics (vibration mode) of the external parts (rotational shaft 12 and housing 30) of rolling bearing 20 to a dynamics analysis model of rolling bearing 20. The mode synthesis method uses the super element method for example to represent the vibration characteristics of rotational shaft 12 and housing 30 by a low-order vibration mode, and introduce the vibration characteristics of rotational shaft 12 and housing 30 to the dynamics analysis model. In this way, the vibration waveform of bearing device 10 can be calculated in the dynamics analysis.

Figure 16:
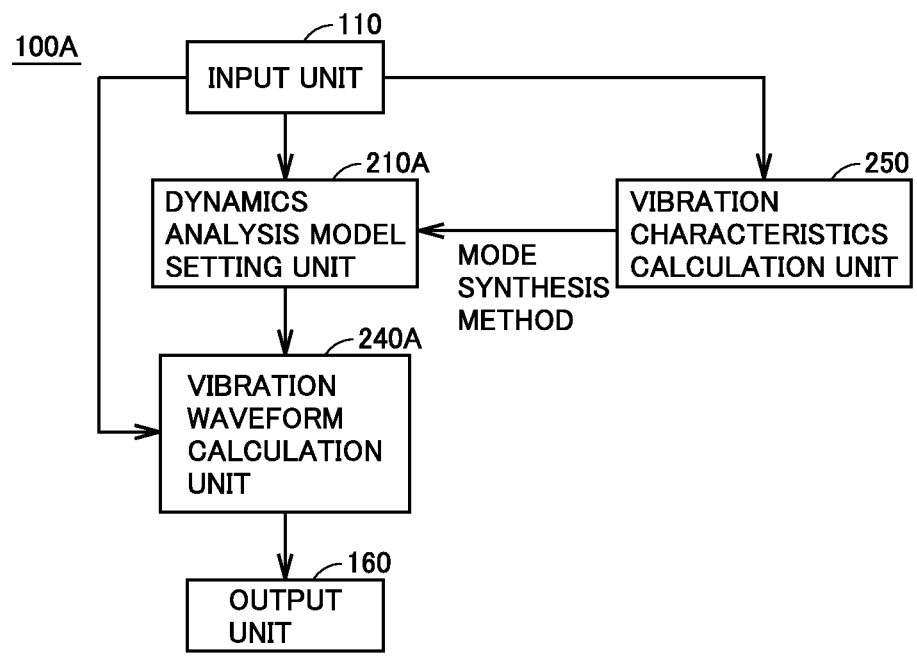
FIG. 16 is a functional block diagram functionally showing a configuration of a vibration analyzer according to a third embodiment.

FIG. 16 is a functional block diagram functionally showing a configuration of a vibration analyzer according to the third embodiment. In the following, the case will exemplarily be described where rolling bearing 20 is formed of a ball bearing. Referring to FIG. 16, a vibration analyzer 100A includes a dynamics analysis model setting unit 210A, a vibration characteristics calculation unit 250, a vibration waveform calculation unit 240A, an input unit 110, and an output unit 160.

Vibration characteristics calculation unit 250 uses the so-called super element method to calculate a vibration mode representing the vibration characteristics of rotational shaft 12 and housing 30. The super element method reduces a characteristic matrix represented by the finite element method (FEM), by means of static reduction of Guyan, to thereby calculate a low-order vibration mode of a target object.

Dynamics analysis model setting unit 210A sets a dynamics analysis model of bearing device 10, based on a variety of data about rolling bearing 20 such as characteristics data, lubrication conditions, and operating conditions that are input from input unit 110. Here, dynamics analysis model setting unit 210A introduces, by the mode synthesis method, the vibration mode of rotational shaft 12 and housing 30 which is calculated by vibration characteristics calculation unit 250, to the dynamics analysis model. Accordingly, the dynamics analysis model which is set by dynamics analysis model setting unit 210A is a model including not only dynamic characteristics of rolling bearing 20 but also vibration characteristics of rotational shaft 12 and housing 30.

Vibration waveform calculation unit 240A receives from input unit 110 data about rolling elements 24 and their raceway as well as the damage data. Then, vibration waveform calculation unit 240A uses the above-described contact analysis program to calculate the variation of the approach amount of rolling element 24 due to the damage data.

Further, vibration waveform calculation unit 240A applies the calculated variation of the approach amount of rolling element 24 to the dynamics analysis model which is set by dynamics analysis model setting unit 210A, and calculates the history of the exciting force and the displacement (vibration waveform) occurring to bearing device 10 due to the variation of the approach amount of rolling element 24 when rotational shaft 12 is operated under the input operating conditions. The data about the vibration waveform calculated by vibration waveform calculation unit 240A is output to output unit 160.

Figure 17:
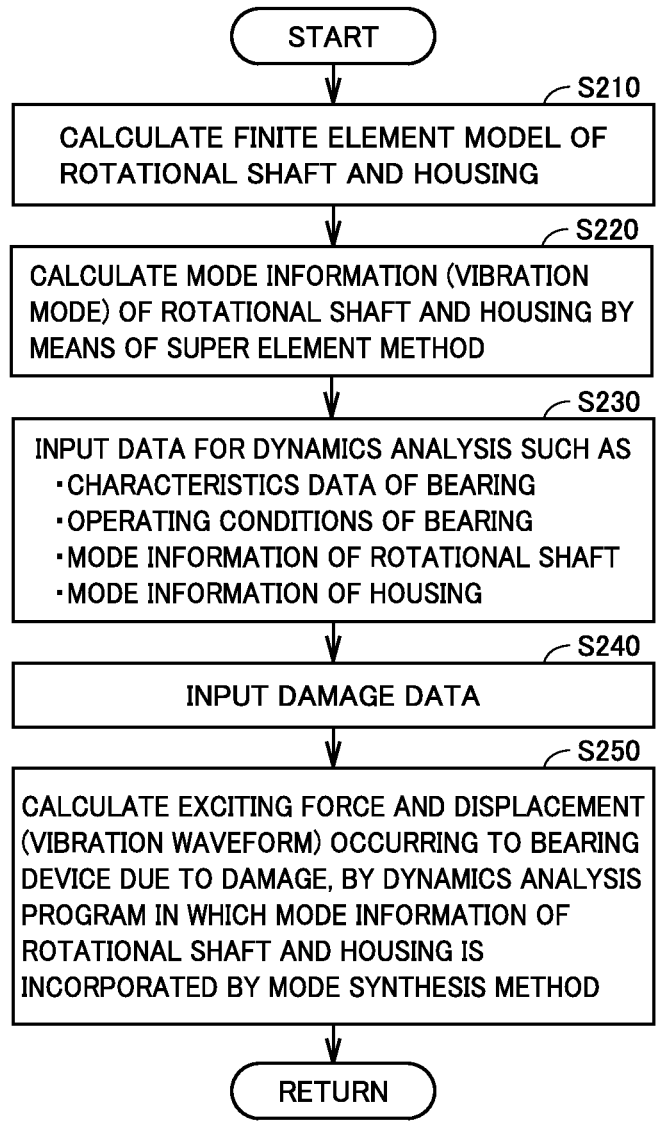
FIG. 17 is a flowchart for illustrating a process procedure of a vibration analysis method executed by a vibration analyzer according to the third embodiment.

FIG. 17 is a flowchart for illustrating a process procedure of a vibration analysis method executed by vibration analyzer 100A according to the third embodiment. Referring to FIG. 17, vibration analyzer 100A calculates a finite element model of rotational shaft 12 and housing 30 (step S210). Then, vibration analyzer 100A calculates mode information (vibration mode) of rotational shaft 12 and housing 30 according to a prepared super element method analysis program (step S220).

Subsequently, vibration analyzer 100A reads a variety of data for conducting the dynamics analysis (step S230). Specifically, vibration analyzer 100A reads the characteristics data and the operating conditions of rolling bearing 20 from input unit 110, and reads mode information of each of rotational shaft 12 and housing 30 calculated in step S220. Further, vibration analyzer 100A reads from input unit 110 the data about damage given to rolling bearing 20 (step S240).

Then, vibration analyzer 100A calculates, according to the dynamics analysis program in which the mode information (vibration mode) of rotational shaft 12 and housing 30 is incorporated by the mode synthesis method, the exciting force and the displacement (vibration waveform) which occur to bearing device 10 due to damage which is input in step S240 when rotational shaft 12 is operated under the operating conditions which are input in step S230 (step S250).

It should be noted that a similar technique may be applied to the second embodiment to introduce to the dynamics analysis model the vibration characteristics (vibration mode) of rotational shaft 12 and housing 30 by the mode synthesis method which, however, is not particularly shown.

In the third embodiment as seen from the above, the mode synthesis method is used to introduce the vibration characteristics (vibration mode) of rotational shaft 12 and housing 30 into the dynamics analysis model, and the vibration waveform of bearing device 10 is calculated in the dynamics analysis. In the dynamics analysis, the shaft and the rolling elements move from moment to moment, and the influence of revolution of a spring element which couples the inner ring and the outer ring of the bearing to each other and the influence of shift of the position where the exciting force occurs due to peeling are precisely reflected. Thus, the vibration waveform can be predicted with high precision (it should be noted that it takes a long calculation time and therefore a high-speed analyzer is necessary). Therefore, in the third embodiment as well, the vibration waveform of bearing device 10 in the case of occurrence of damage in the bearing can be predicted by means of vibration analyzer 100A. Consequently, the threshold value used for making a determination about an abnormality of the rolling bearing by the condition monitoring system of the rolling bearing which is applied to a wind power generation facility for example can more appropriately be determined.

According to the above description, the example is presented where the vibration characteristics of the rotational shaft and the housing are introduced by the mode synthesis method. Alternatively, a method may be employed that directly introduces a finite element model into a dynamics model and dynamically solves motions at all nodes, while this method takes a long calculation time. This technique requires a still faster analyzer while the precision of calculation is likely to be higher relative to the mode synthesis method.

Fourth Embodiment

In this fourth embodiment, the vibration analyzer also calculates the threshold value used for making a determination about an abnormality of the rolling bearing by the condition monitoring system of the rolling bearing. Namely, the vibration analyzer illustrated in the fourth embodiment also determines the threshold value of vibration used by the condition monitoring system for making a determination about an abnormality based on a predicted vibration waveform.

Figure 18:
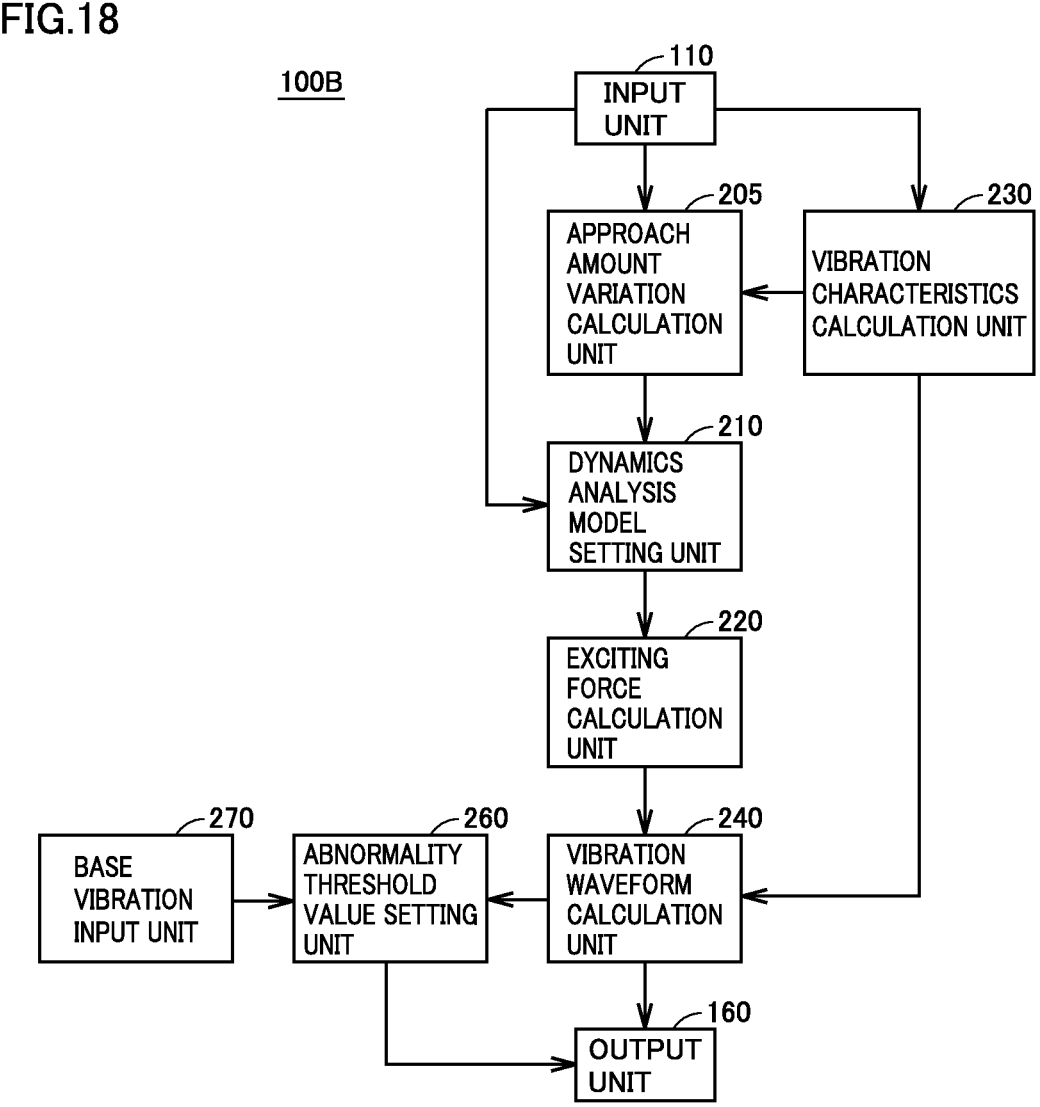
FIG. 18 is a functional block diagram functionally showing a configuration of a vibration analyzer according to a fourth embodiment.

FIG. 18 is a functional block diagram functionally showing a configuration of the vibration analyzer according to the fourth embodiment. While the following description will exemplarily be given based on the first embodiment, similar addition of functions to the other embodiments can be made as well.

Referring to FIG. 18, a vibration analyzer 100B additionally includes an abnormality threshold value setting unit 260 and a base vibration input unit 270, relative to the configuration of vibration analyzer 100 in the first embodiment shown in FIG. 3.

Base vibration input unit 270 generates a base vibration waveform representing a vibration waveform which is exhibited when rolling bearing 20 is normal. While the base vibration waveform is preferably determined by an actually measured value of a bearing of the same form, it may be an expected value derived from a measured value of a device of the same kind. To this base vibration waveform, a vibration waveform received from vibration waveform calculation unit 240 is added, and the resultant waveform is a waveform which is expected to be exhibited when an abnormality occurs.

Abnormality threshold value setting unit 260 receives from vibration waveform calculation unit 240 a calculated value of a vibration waveform at a location where a vibration sensor is attached to bearing device 10. Then, abnormality threshold value setting unit 260 uses the vibration waveform received from vibration waveform calculation unit 240 and the base vibration waveform received from base vibration input unit 270 to determine a threshold value of the magnitude of vibration for determining that rolling bearing 20 is abnormal. By way of example, abnormality threshold value setting unit 260 calculates the root mean square value of the vibration waveform and the root mean square value of the AC component of the envelope waveform, from the data about the vibration waveform expected to be exhibited when an abnormality occurs, and determines the threshold value based on the results of the calculation.

The threshold value used for making a determination about an abnormality may be determined by applying, from abnormality threshold value setting unit 260 to exciting force calculation unit 220, data about damage of various magnitudes, and calculating the vibration waveform for each damage data which, however, is not particularly shown.

Figure 19:
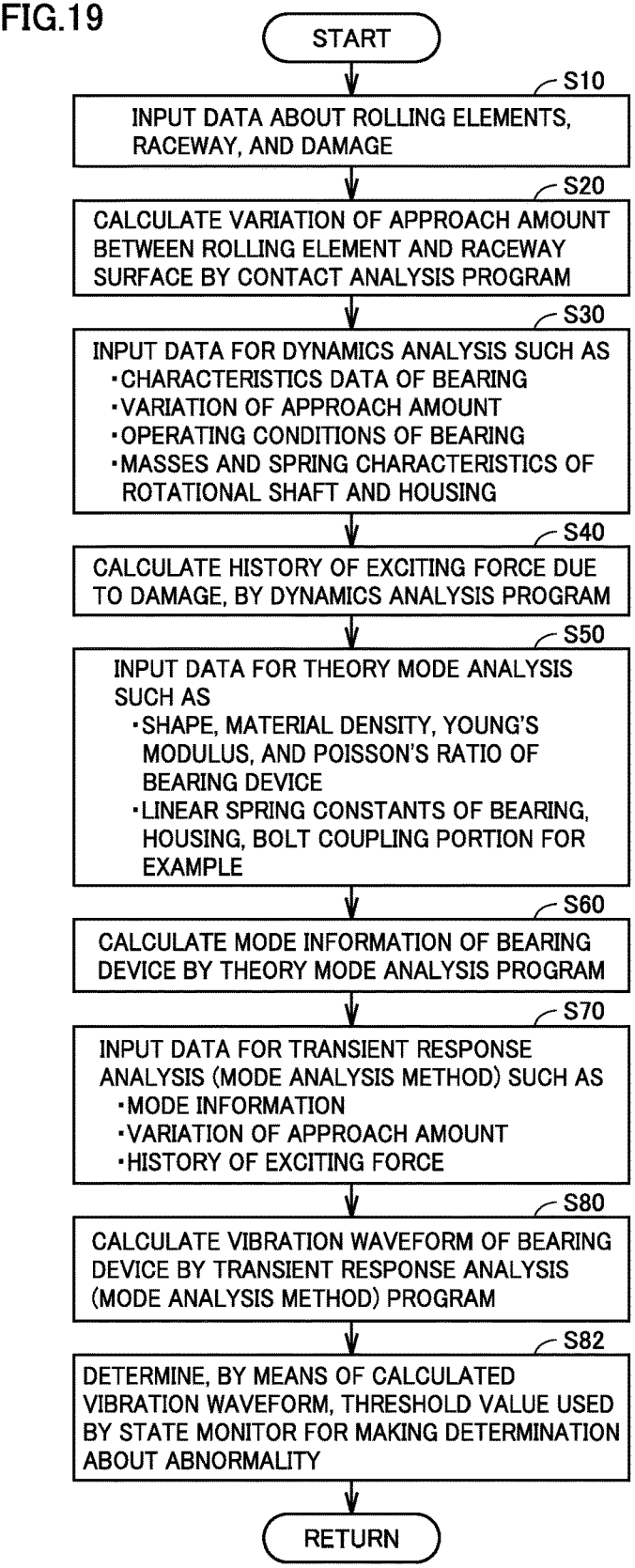
FIG. 19 is a flowchart for illustrating a process procedure of a vibration analysis method executed by the vibration analyzer according to the fourth embodiment.

FIG. 19 is a flowchart for illustrating a process procedure of the vibration analysis method executed by vibration analyzer 100B according to the fourth embodiment. Referring to FIG. 19, this flowchart additionally includes step S82 relative to the flowchart shown in FIG. 4.

In the fourth embodiment, the vibration waveform at the location where the vibration sensor is attached to bearing device 10 is calculated in step S80. Upon calculation of the vibration waveform in step S80, vibration analyzer 100B uses the calculated vibration waveform to determine the threshold value of the magnitude of vibration which is used by the condition monitoring system for determining that rolling bearing 20 is abnormal (step S82).

A similar technique to the above may also be used in the above-described second and third embodiments to determine, based on a vibration waveform predicted by the vibration analyzer, the threshold value of vibration which is used by the condition monitoring system for making a determination about an abnormality which, however, is not particularly shown.

In the fourth embodiment as seen from the above, vibration analyzer 100 (100A, 100B) can determine the threshold value which is used by the condition monitoring system of the rolling bearing for making a determination about an abnormality of the rolling bearing.

In each of the above-described embodiments, it is supposed that outer ring 26 which is a stationary ring is connected to housing 30 through linear springs kF1 to kF3 in the radial direction of the bearing at the positions of the rolling elements located within the load-applied area, among a plurality of rolling elements 24, as shown in FIG. 1. It may be supposed, however, that the outer ring is spring-connected to housing 30 in the radial direction of the bearing at the center of the rolling elements located in the load-applied area.

Further, in each of the above-described first and second embodiments and the fourth embodiment based on them, the history of the exciting force occurring due to given damage is applied to at least one point on the central axis of inner ring 22 of rolling bearing 20. The history of the exciting force, however, may be applied to rolling element 24 within the load-applied area, depending on a share of the force supported by each rolling element 24 within the load-applied area.

Further, in the foregoing description, the threshold value used for making a determination about an abnormality that is determined by means of the results of analysis by the vibration analyzer is applied, by way of example, to the condition monitoring system of the rolling bearing in a wind power generation facility. It can also be applied to other facilities, such as the condition monitoring system of the rolling bearing in a railway vehicle, for example.

It should be construed that the embodiments disclosed herein are given by way of illustration in all respects, not by way of limitation. It is intended that the scope of the present invention is defined by claims, not by the above description of the embodiments, and encompasses all modifications and variations equivalent in meaning and scope to the claims.

REFERENCE SIGNS LIST

10 bearing device; 12 rotational shaft; 20 rolling bearing; 22 inner ring; 24 rolling element; 26 outer ring; 30 housing; 40 base; 100, 100A, 100B vibration analyzer; 110 input unit; 120 I/F unit; 130 CPU; 140 RAM; 150 ROM; 160 output unit; 205 approach amount variation calculation unit; 210, 210A dynamics analysis model setting unit; 220 exciting force calculation unit; 230, 250 vibration characteristics calculation unit; 240, 240A vibration waveform calculation unit; 260 abnormality threshold value setting unit; 270 base vibration input unit; 310 wind power generation facility; 320 main shaft; 330 blade; 340 speed increaser; 350 generator; 360 bearing; 370 vibration sensor; 380, 380A data processor; 390 nacelle; 400 tower; 410, 450 HPF; 420, 460 root mean square value calculation unit; 430 modified vibration factor calculation unit; 440 envelope processing unit; 470 modified modulation factor calculation unit; 480 storage unit; 490 diagnosis unit; 500 speed function generation unit; 510 rotation sensor.

The invention claimed is:

1. A bearing device vibration analysis and monitoring method for analyzing, by a computer simulation, vibration of a bearing device including a rolling bearing and a housing of the rolling bearing, and monitoring for abnormalities, the method comprising the steps of:
   receiving input data, from an input unit, about a shape of damage of a contact portion where a rolling element and a raceway surface of a damaged rolling bearing contact each other;
   calculating a history of an exciting force of said damaged rolling bearing, the history of the exciting force occurring to said damaged rolling bearing due to said damage when a rotational shaft of said rolling bearing is rotated;
   calculating a vibration characteristics model of said bearing device, the vibration characteristics model representing vibration characteristics of said bearing device;
   calculating a vibration waveform at a predetermined position on said bearing device by applying to said vibration characteristics model the history of the exciting force calculated in said step of calculating a history of an exciting force, where said history of the exciting force is applied to at least one point on a central axis of a rotational ring of said rolling bearing in said vibration characteristics model;
   calculating a predetermined threshold value corresponding to an abnormal rolling bearing, based on the calculated vibration waveform;
   monitoring, with a vibration sensor, a vibration of the bearing device;
   determining that a rolling bearing of the bearing device is abnormal when a magnitude of the monitored vibration exceeds the predetermined threshold value; and
   outputting, with an output unit, the determination that the rolling bearing of the bearing device is abnormal.

2. The bearing device vibration analysis method according to claim 1, further comprising the step of determining a threshold value of a magnitude of vibration for determining that said rolling bearing is abnormal, using the vibration waveform calculated in said step of calculating a vibration waveform.

3. The bearing device vibration analysis method according to claim 1, wherein
   said rolling bearing is a ball bearing, and
   said step of calculating a history of an exciting force includes the steps of:
   calculating a variation of a displacement between said rolling element and said raceway surface caused by said damage; and
   calculating said history of the exciting force occurring to said rolling bearing due to said variation of the displacement when the rotational shaft of said rolling bearing is rotated.

4. The bearing device vibration analysis method according to claim 1, wherein
   said rolling bearing is a roller bearing,
   for said calculation of the history of the exciting force, a slice method is used by which a contact load is calculated for each of minute-width sections which are obtained by slicing a contact portion between a roller and a raceway surface along an axial direction of the roller,
   said bearing device vibration analysis method further comprises the step of calculating, for each slice, a variation of a displacement between the roller and the raceway surface caused by damage, and
   said step of calculating a history of an exciting force includes the step of calculating said history of the exciting force for which said slice method is used.

5. The bearing device vibration analysis method according to claim 3, wherein said displacement is based on an elastic analysis.

6. The bearing device vibration analysis method according to claim 1, wherein in said step of calculating a history of an exciting force, it is supposed that a stationary ring of said rolling bearing is connected to said housing through a linear spring in a bearing radial direction at a position of a rolling element within a load-applied area.

7. The bearing device vibration analysis method according to claim 1, wherein in said step of calculating a vibration waveform, said history of the exciting force is applied to a rolling element within a load-applied area, depending on a share of a force supported by each rolling element within said load-applied area.

8. A bearing device vibration analyzer for analyzing and monitoring, by a computer simulation, vibration of a bearing device including a rolling bearing and a housing of the rolling bearing, and monitoring for abnormalities, comprising:
   an input unit, configured to receive input data about a shape of damage of a contact portion where a rolling element and a raceway surface of a damaged rolling bearing contact each other;

one or more processors, configured to:

calculate a history of an exciting force of said rolling bearing, the history of the exciting force occurring to said damaged rolling bearing due to said damage when a rotational shaft of said rolling bearing is rotated, calculate a vibration characteristics model of said bearing device, the vibration characteristics model representing vibration characteristics of said bearing device, calculate a vibration waveform at a predetermined position on said bearing device by applying, to said vibration characteristics model calculated by said vibration characteristics calculation unit, the history of the exciting force calculated by said exciting force calculation unit, where said history of the exciting force is applied to at least one point on a central axis of a rotational ring of said rolling bearing in said vibration characteristics model, and calculate a predetermined threshold value corresponding to an abnormal rolling bearing, based on the calculated vibration waveform;

a vibration sensor, configured to monitor a vibration of the bearing device; and an output unit, configured to output when a magnitude of the monitored vibration exceeds the predetermined threshold value.

9. A rolling bearing condition monitoring system comprising:

a vibration sensor for measuring vibration of a bearing device including a rolling bearing and a housing of the rolling bearing;

an input configured to receive data about a shape of damage of a contact portion where a rolling element and a raceway surface of said rolling bearing contact each other;

a determination unit configured to:

determine a predetermined threshold value by calculating a history of an exciting force of said rolling bearing, the history of the exciting force occurring to said rolling bearing due to said damage when a rotational shaft of said rolling bearing is rotated, calculating a vibration characteristics model of said bearing device, the vibration characteristics model representing vibration characteristics of said bearing device, and calculating a vibration waveform at a position where said vibration sensor is placed on said bearing device, by applying to said vibration characteristics model the history of the exciting force calculated in said step of calculating a history of an exciting force, where said history of the exciting force is applied to at least one point on a central axis of a rotational ring of said rolling bearing in said vibration characteristics model; and determine that said rolling bearing is abnormal when a magnitude of the vibration measured with said vibration sensor exceeds the predetermined threshold value; and an output, configured to output when the rolling bearing of the bearing device is determined to be abnormal.

10. The bearing device vibration analysis method according to claim 4, wherein said displacement is based on an elastic analysis.

* * * * *